(12) United States Patent
Lagakos et al.

(10) Patent No.: US 7,697,798 B2
(45) Date of Patent: Apr. 13, 2010

(54) FIBER OPTIC PRESSURE SENSORS AND CATHETERS

(75) Inventors: Nicholas Lagakos, Silver Spring, MD (US); Joseph A Bucaro, Herndon, VA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 12/356,678

(22) Filed: Jan. 21, 2009

(65) Prior Publication Data

US 2009/0202195 A1 Aug. 13, 2009

Related U.S. Application Data

(60) Provisional application No. 61/027,680, filed on Feb. 11, 2008.

(51) Int. Cl.
*G02B 6/00* (2006.01)
*B29D 11/00* (2006.01)
*G01J 1/56* (2006.01)
*G01L 19/04* (2006.01)
*H01L 21/00* (2006.01)

(52) U.S. Cl. .............................. 385/13; 385/12; 385/1; 385/5; 385/6; 385/123; 385/127; 216/24; 250/231.19; 73/708; 438/27; 438/28; 438/29

(58) Field of Classification Search .................. 385/12, 385/13, 123, 27, 28, 1, 5, 6, 7; 72/800; 73/708; 250/227.11, 227.21, 231.19; 216/24; 438/27, 438/28, 29, 31

See application file for complete search history.

(56) References Cited

U.S. PATENT DOCUMENTS 4,085,254 A 4/1978 Atkins
4,085,630 A 4/1978 Williams (Continued)

OTHER PUBLICATIONS

Shimada, M., Kinefuchi, Y., and Takahashi, K., "Sleeve-Type Ultra Miniature Optical Fiber Pressure Sensor Fabricated by DRIE", IEEE Sensors Journal, vol. 8, No. 7, Jul. 2008, pp. 1337-1341.

(Continued)

*Primary Examiner*—Brian M Healy
(74) *Attorney, Agent, or Firm*—Amy L. Ressing; Sally A. Ferrett

(57) ABSTRACT

A catheter with many fiber optic pressure sensors. The sensor diaphragm is formed from a wafer with a thin silicon layer and a silicon substrate layer separated by a silicon dioxide layer. A method includes masking and etching channels through the silicon substrate layer in a pattern of concentric circles to form a concentric circular etched channels and cylindrical unetched portions of the silicon substrate layer between the channels, exposing the silicon dioxide in the etched regions, and dissolving the exposed silicon dioxide to expose the crystalline silicon layer in the etched regions. The unetched cylindrical portion of the silicon substrate forms the diaphragm support element and the thin silicon layer forms the diaphragm. After applying a reflective coating to the exposed thin silicon layer, the support element face is adhered to the end face of a tubular housing, and a fiber optic probe is inserted in the tubular housing.

30 Claims, 30 Drawing Sheets

U.S. PATENT DOCUMENTS

| | | | |
|---|---|---|---|
| 4,162,397 A | 7/1979 | Bucaro et al. | |
| 4,238,856 A | 12/1980 | Bucaro et al. | |
| 4,278,743 A | 7/1981 | Thompson | |
| 4,363,114 A | 12/1982 | Bucaro et al. | |
| 4,427,263 A | 1/1984 | Lagakos et al. | |
| 4,472,022 A | 9/1984 | Bearcroft et al. | |
| 4,482,205 A | 11/1984 | Lagakos et al. | |
| 4,621,896 A | 11/1986 | Lagakos et al. | |
| 4,787,396 A * | 11/1988 | Pidorenko | 600/480 |
| 4,800,267 A | 1/1989 | Freal et al. | |
| 4,805,630 A | 2/1989 | Storey | |
| 4,930,862 A | 6/1990 | Miers et al. | |
| 4,979,798 A | 12/1990 | Lagakos et al. | |
| 4,994,668 A | 2/1991 | Lagakos et al. | |
| 5,146,083 A | 9/1992 | Zuckerwar et al. | |
| 5,158,838 A | 10/1992 | Bjordal et al. | |
| 5,242,768 A | 9/1993 | Nagatsuka et al. | |
| 5,279,793 A | 1/1994 | Glass | |
| 5,288,564 A | 2/1994 | Klein et al. | |
| 5,365,789 A * | 11/1994 | Totterdell et al. | 73/721 |
| 5,367,376 A | 11/1994 | Lagakos et al. | |
| 5,385,053 A * | 1/1995 | Wlodarczyk et al. | 73/705 |
| 5,422,478 A | 6/1995 | Wlodarczyk et al. | |
| 5,427,871 A | 6/1995 | Garshol et al. | |
| 5,438,873 A * | 8/1995 | Wlodarczyk et al. | 73/705 |
| 5,510,895 A | 4/1996 | Sahagen | |
| 5,633,960 A | 5/1997 | Lagakos et al. | |
| 5,770,945 A | 6/1998 | Constable | |
| 5,805,753 A | 9/1998 | Lagakos et al. | |
| 5,825,489 A | 10/1998 | Lagakos et al. | |
| 5,922,903 A | 7/1999 | Pujado | |
| 6,118,534 A | 9/2000 | Miller | |
| 6,218,661 B1 | 4/2001 | Schroeder et al. | |
| 6,281,976 B1 | 8/2001 | Taylor et al. | |
| 6,439,055 B1 | 8/2002 | Maron et al. | |
| 6,462,445 B1 | 10/2002 | Weber et al. | |
| 6,506,313 B1 * | 1/2003 | Fetterman et al. | 216/24 |
| 6,539,136 B1 | 3/2003 | Dianov et al. | |
| 6,575,248 B2 | 6/2003 | Zhang et al. | |
| 6,577,402 B1 | 6/2003 | Miller | |
| 6,597,820 B1 | 7/2003 | Sheem | |
| 6,618,523 B2 * | 9/2003 | Hall et al. | 385/31 |
| 6,701,775 B1 | 3/2004 | Popielas et al. | |
| 6,717,337 B2 | 4/2004 | Howarth et al. | |
| 6,738,145 B2 | 5/2004 | Sherrer et al. | |
| 6,913,854 B1 | 7/2005 | Alberte et al. | |
| 6,998,599 B2 | 2/2006 | Lagakos et al. | |
| 7,020,354 B2 | 3/2006 | Lagakos et al. | |
| 7,118,712 B1 | 10/2006 | Manginell et al. | |
| 7,149,374 B2 | 12/2006 | Lagakos et al. | |
| 7,187,453 B2 | 3/2007 | Belleville | |
| 7,379,630 B2 | 5/2008 | Lagakos et al. | |
| 2002/0176592 A1 | 11/2002 | Howarth et al. | |
| 2004/0099800 A1 | 5/2004 | Lagakos et al. | |
| 2004/0151417 A1 | 8/2004 | Lagakos et al. | |
| 2004/0237629 A1 | 12/2004 | Lenzing et al. | |
| 2005/0041905 A1 | 2/2005 | Lagakos et al. | |
| 2005/0180699 A1 | 8/2005 | Shu et al. | |
| 2006/0072887 A1 | 4/2006 | Lagakos et al. | |
| 2009/0202195 A1* | 8/2009 | Lagakos et al. | 385/13 |

OTHER PUBLICATIONS

Melamud, R. et al., "Development of an SU-8 Fabry-Perot Blood Pressure Sensor" IEEE International Conference on Micro Electro Mechanical Systems, 2005, pp. 810-813.

Shimada, M., Kinefuchi, Y., and K. Takahashi, "Sleeve-Type Ultra Miniature Optical Fiber Pressure Sensor Fabricated by DRIE", IEEE Sensors Journal, vol. 8, No. 7, Jul. 2008, pp. 1337-1341.

Zuckerwar, A.J., Cuomo, F.W., Nguyen, T.D., Rizzi, S.A., and S.A. Clevenson "High-temperature fiber-optic lever microphone" J.Acoust. Soc. Am. 97 (6), Jun. 1995 pp. 3605-3616.

Hu, A., Cuomo, F.W., and Zuckerwar, A.J., "Theoretical and experimental study of a fiber optic microphone" J. Acoust. Soc. Am 91 (5), May 1992 pp. 3049-3056.

Bucaro, J.A. and N. Lagakos, "Lightweight Fiber Optics Microphones and Accelerometers", Review of Scientific Instruments. vol. 72 pp. 2816-2821 (Jun. 2001).

Miers, D.R., Raj, D., and J.W. Berthold, "Design and Characterization of Fiber-Optic Accelerometers" Proc. Fiber Optic Laser Sensor V, DPIE vol. 838, pp. 314-317 (1987).

Lagakos, N., Cole, J.H., and J. A. Bucaro, "Microbend Fiber-optic Sensor," Applied Optics 26, pp. 2171-2180 (Jun. 1987).

He, G. and F. W. Cuomo, "Displacement Response, Detection Limit, and Dynamic Range of Fiber Optic Level sensors," J. Lightwave Tech., vol. 9, No. 11, p. 1618-1625 (Nov. 1991).

Bucaro, J.A., and N. Lagakos,"Fiber Optics Pressure and Acceleration Sensors", Proceeding of the 47th International Instrument symposium, Denver, CO (May 6-10, 2001).

International Search Report and Written Opinion, PCT/US09/33734, dated Mar. 30, 2009.

Totsu, K., Haga, Y., Esashi, M., "Ultra-miniature fiber-optic pressure sensor using white light interferometry", J. Micromechanics and Micromachining, vol. 15, pp. 71-75, 2005.

Katamatsu, H., et al., "Micromachined 125 um diameter ultra miniature fiber-optic pressure sensor for catheter", T. IEE Japan, vol. 120-E, No. 2, pp. 58-63 (2000).

* cited by examiner

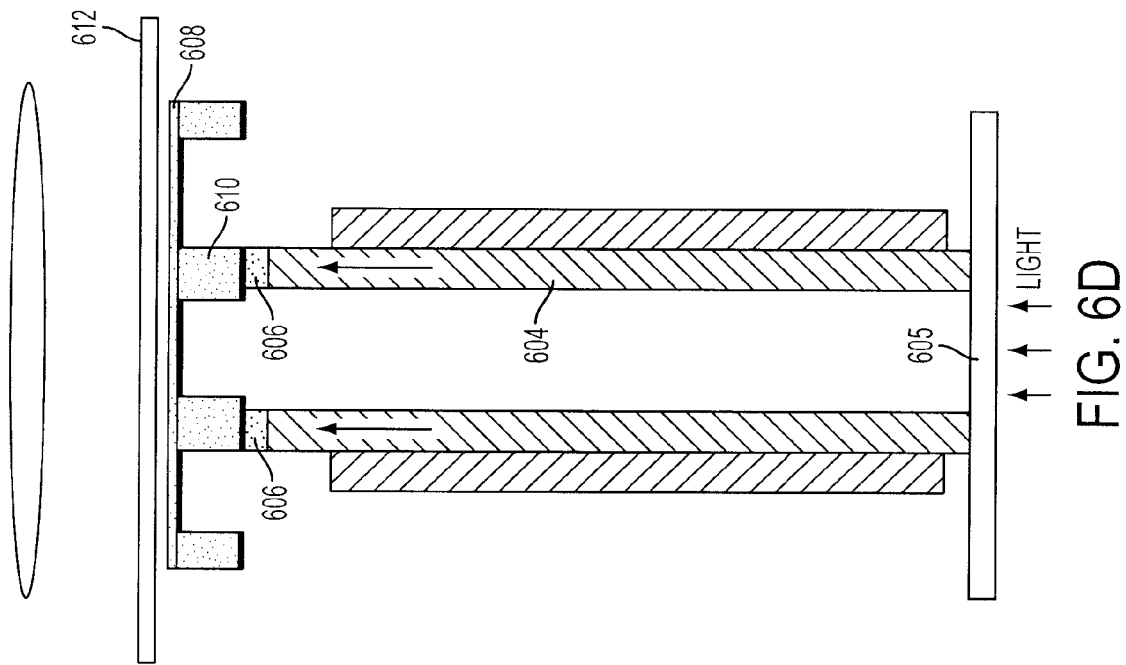
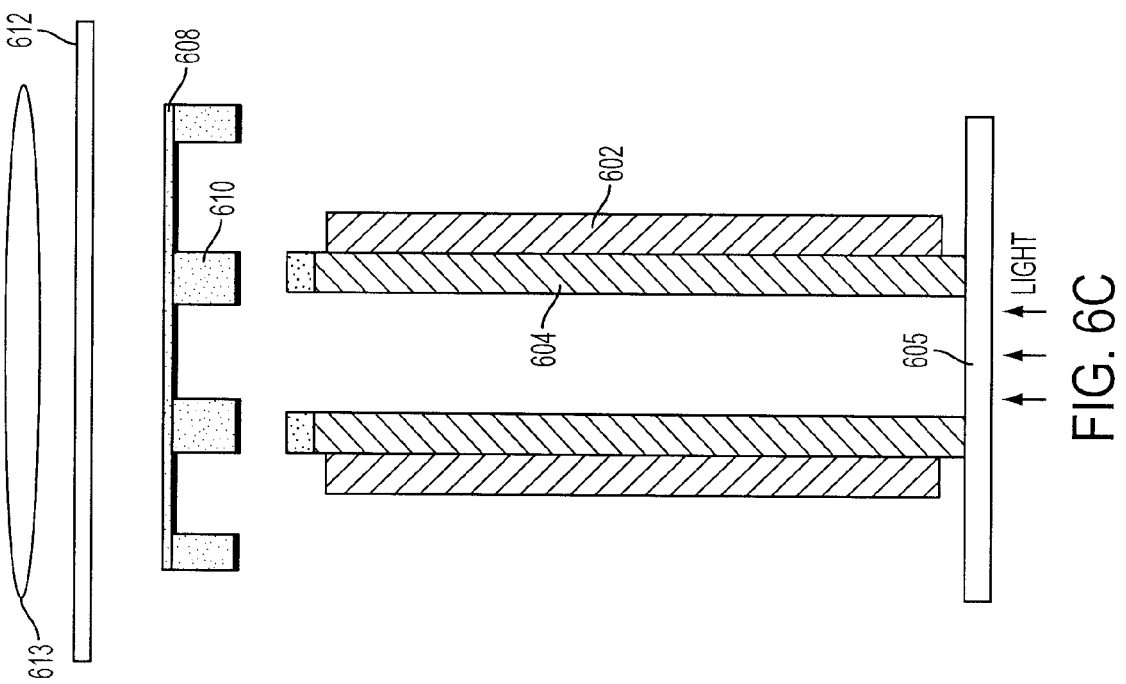

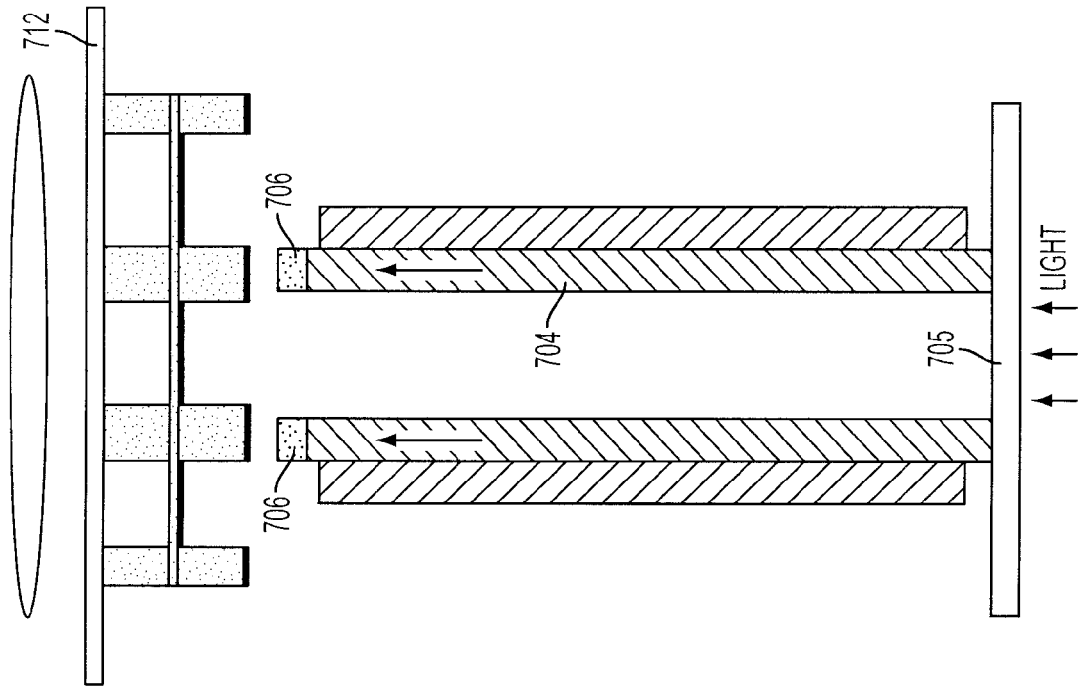
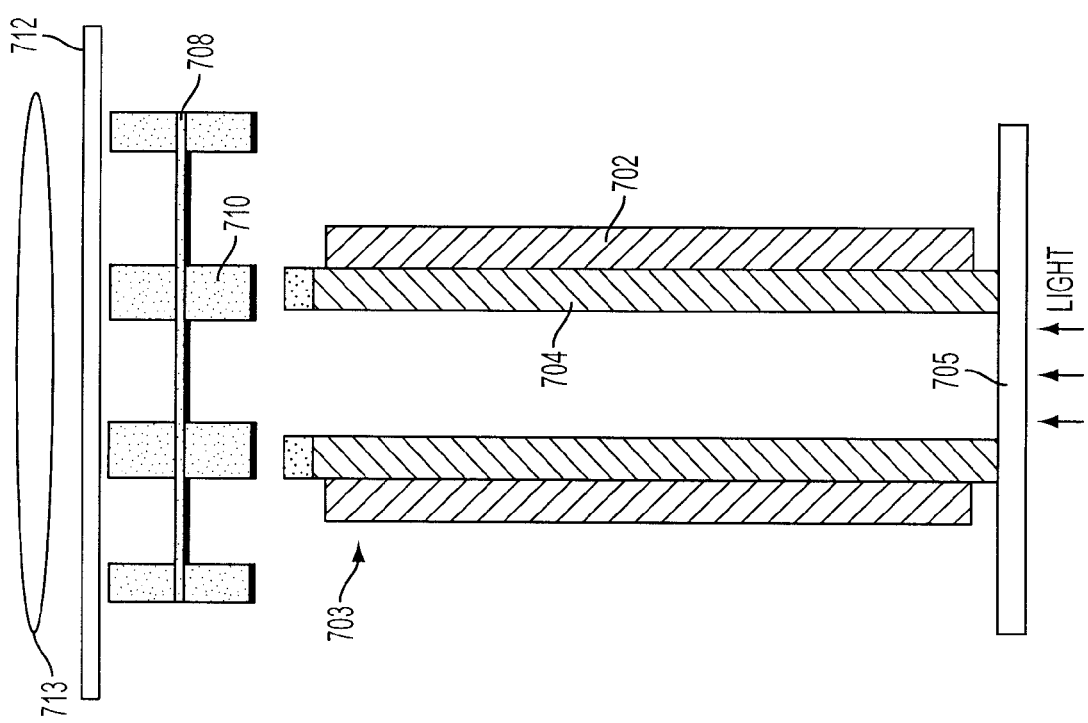

FIBER OPTIC PRESSURE SENSORS AND CATHETERS

CROSS-REFERENCE TO RELATED APPLICATIONS

This Application is a nonprovisional of provisional (35 USC 119(e)) application 61/027,680 filed on Feb. 11, 2008, the entire disclosure of which is incorporated herein in its entirety.

BACKGROUND OF THE INVENTION

1. Technical Field

The invention is related to miniature fiber optic pressure sensors, and more particularly, to catheters with sensors for measuring pressure in the human body.

2. Background

In recent years, optical fibers have formed the basis for many different types of sensors, such as microphones, static and dynamic pressure sensors, strain sensors, among others. Optical fiber sensors can use interferometry or intensity modulation. Intensity modulated fiber optic sensors, while often less sensitive than comparable interferometric sensors, are simpler and less expensive.

The theory of intensity modulated optical fiber sensors, including pressure sensors and microphones, and examples of such sensors, are disclosed in U.S. Pat. No. 7,379,630 to Lagakos et al., U.S. Pat. No. 7,020,354 to Lagakos et al., and U.S. Patent Publication No. 20060072887 to Lagakos et al. The entire disclosure of these documents is incorporated herein by reference. U.S. Pat. No. 7,149,374 to Lagakos et al. discloses fiber optic pressure sensors having an etched diaphragm, and methods for forming the diaphragm. The entire disclosure of this document is incorporated herein by reference.

Optical fibers also form the basis for medical catheter devices for insertion into a human blood vessel. Examples include U.S. Pat. No. 7,447,388, to Bates et al., entitled "Systems and Methods for Minimally-Invasive Optical-Acoustic Imaging" and U.S. Pat. No. 7,396,354 to Rychnovsky et al., entitled "Light Delivery Catheter", U.S. Pat. No. 7,384,407 to Rodriguez et al., entitled "Small Vessel Ultrasound Catheter" discloses a catheter with a fiber optic temperature sensor suitable for small blood vessels. In "Development of an SU-8 Fabry-Perot blood pressure sensor", IEEE International Conference on Micro Electro Mechanical Systems, 2005, pp. 810-813, R. Melamud, A. A. Davenport, G. C. Hill, I. H. Chan, F. Declercq, P. G. Hartwell, and B. L. Pruitt disclose a Fabry-Perot interferometer based optical fiber pressure sensor suitable for use in human blood vessels and a method for forming the sensor using photolithography.

M. Shimada, Y. Kinefuchi, and K. Takahashi, "Sleeve-Type Ultra Miniature Optical Fiber Pressure Sensor Fabricated by DRIE", IEEE Sensors Journal, Vol. 8, No. 7, July 2008, pp. 1337-1341, discloses an interferometric optical fiber pressure sensor and method for forming the sensor.

SUMMARY

An aspect of the invention includes an intensity modulated fiber optic pressure sensor that includes at least one multimode optical fiber with a core and cladding surrounding the core, a diaphragm with a reflective surface and an outer circumferential edge attached to a cylindrical support element. The at least one cylindrical housing is arranged circumferentially around the diaphragm and the optical fiber, with an end face of the cylindrical housing being adhered to the cylindrical support element. The diaphragm has an exterior face exposed to the exterior environment, and the diaphragm, the support element, and an end of the optical fiber forming a cavity.

The diaphragm can be silicon, with a reflective metallic layer evaporated onto the diaphragm. The support element can be silicon. The stopping layer between the diaphragm layer and support element layer can be silica ($SiO_2$)

The diaphragm and the cylindrical support element can be formed by a process of masking and etching a portion of a first silicon layer of a silicon-on-insulator wafer, wherein the unetched portion forms the cylindrical support element, and an exposed portion of a second silicon layer of the silicon-on-insulator wafer is the diaphragm.

The diaphragm can be formed by a process of providing a wafer with a thin silicon layer and a silicon substrate layer separated by a silica layer, masking and etching channels through the silicon substrate layer in a pattern of concentric circles to form a circular unetched portion of the silicon substrate layer between concentric circular etched channels, said etching exposing the silica stopping layer within in the concentric circular etched channels, removing a photoresist material, and dissolving an exposed portion of the silicon dioxide layer to expose the thin silicon layer. The unetched circular portion of the silicon substrate layer forms the cylindrical support element and the thin silicon layer forms the diaphragm.

The at least one optical fiber can be only one optical fiber, two, optical fibers, or one optical fiber located along a central axis and six optical fibers arranged around the one optical fiber.

The pressure sensor can operate with light transmitted from the end face of one of the at least one optical fibers, and a pressure difference between the exterior and the cavity causes deflection of the diaphragm and a change in an amount of light reflected by the diaphragm into one of the at least one optical fibers. The pressure difference can be a static pressure difference, or a dynamic pressure difference.

A housing can include at least one cylindrical tube. The housing can include at least two concentric stainless steel tubes, with an inner one of the two concentric stainless steel tubes having an end face adhered to the cylindrical support element, and an outer one of the two concentric stainless steel tubes having an end face that extends in a longitudinal direction at least as far as the exterior surface of the diaphragm.

The sensor can also include a second cylindrical support element disposed on an opposite face of the diaphragm, aligned with the first cylindrical support element.

The sensor can include a flexible polymer sheath enclosing the pressure sensor.

The diaphragm can have a thickness of between 0.5 and 5 microns, and more preferably, between about 1 and 2 microns. The diaphragm can have a thickness of about 1 microns.

An aspect of the invention is directed to a fiber optic pressure sensing catheter system. The system includes a plurality of fiber optic pressure sensors. The optical fibers of the fiber optic pressure sensors in the catheter system are bundled in a catheter sleeve with a diameter of less than 1 mm.

Aspects of the invention are directed to methods of forming diaphragms with support elements and pressure sensors having diaphragms with support elements.

A method of forming optical fiber sensor includes providing a wafer with a silicon substrate layer and a thin silicon layer having a thickness less than the thickness of the silicon substrate layer, and a silica layer positioned between the silicon substrate layer and the thin silicon layer. The method includes masking and etching a pattern of concentric channels through the silicon substrate layer to form a continuous unetched portion of the silicon substrate layer between the concentric channels. Etching exposes the silica in the concentric etched channels. The method includes exposing the thin silicon layer in the etched portion, and forming a reflective coating on the exposed portion of the thin silicon layer. A flat end surface of a first hollow tube is adhered to the flat surface of the continuous unetched portion of the silicon substrate layer. An optical fiber probe having at least one optical fiber is positioned within the tube with an end face of the optical fiber spaced apart from the reflective coating; and affixing the optical fiber probe within the first hollow tube.

In a method for forming an optical fiber sensor, the first hollow tube can be cylindrical, the concentric etched channels can be circular, the continuous unetched portion of the silicon substrate layer is circular, and the end face of the first hollow tube can be adhered to the circular continuous unetched portion of the silicon substrate layer.

The housing can also include a second cylindrical tube surrounding the first cylindrical tube, with a subsequent step of breaking the diaphragm and support element away from the first metal tube, positioning the second cylindrical tube with an end extending beyond the diaphragm; and adhering the second cylindrical tube to the first cylindrical tube.

BRIEF DESCRIPTION OF THE DRAWINGS

FIG. 6A-6H illustrate a method for forming the fiber optic pressure sensor using the etched wafer of FIG. 5D or 4G according to an exemplary embodiment of the invention.

FIG. 7A-7F illustrate a method for forming a two-fiber pressure sensor.

DETAILED DESCRIPTION OF EMBODIMENTS OF THE INVENTION

Figure 1A:
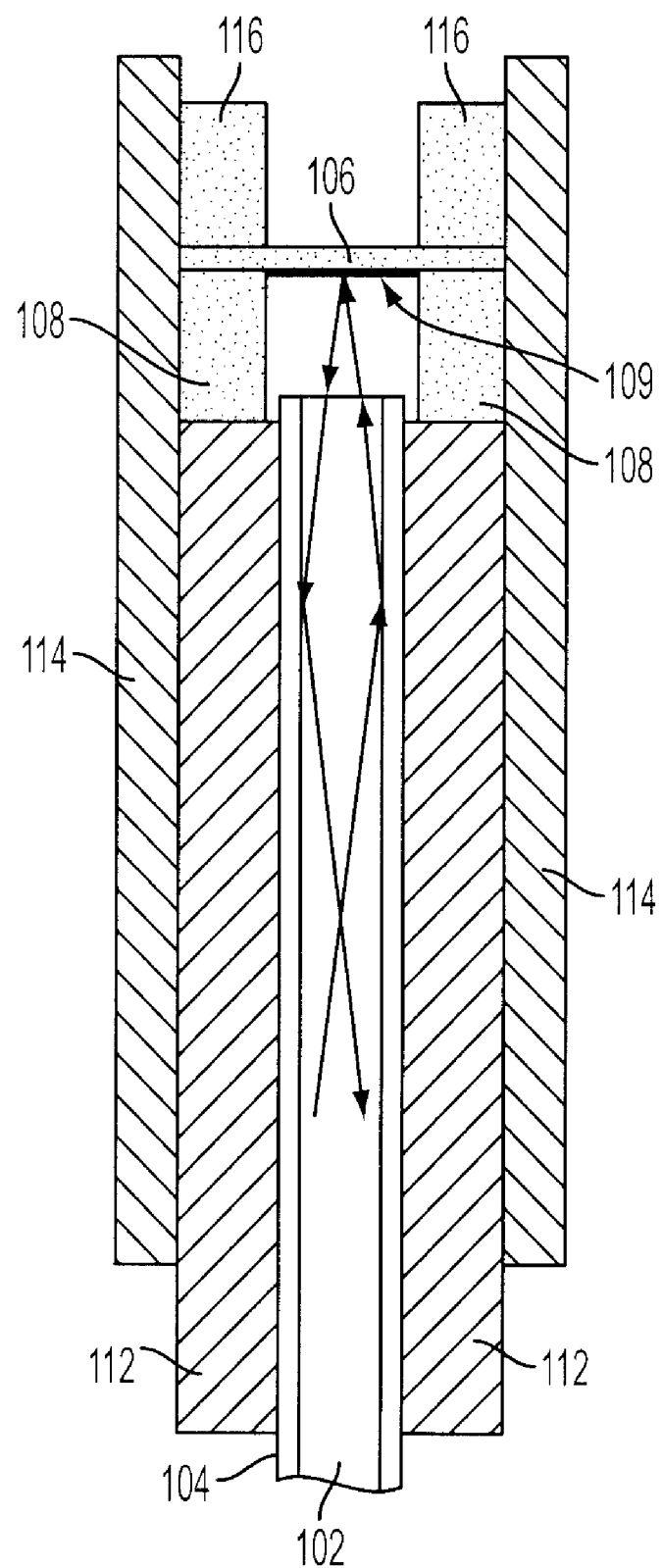
FIG. 1A is a cross sectional view of an exemplary optical fiber sensor having one optical fiber for transmitting light to a reflective diaphragm and for receiving light reflected by the diaphragm.

FIG. 1A illustrates an exemplary pressure sensor in accordance with an embodiment of the invention. The sensor includes an optical fiber 100 having a core 102 and cladding 104, and a silicon diaphragm 106. A cylindrical support element 108 is provided at the face of the diaphragm 106 facing the optical fiber. Another cylindrical support element 116 is located at the opposite face of the diaphragm. In an exemplary embodiment, the cylindrical support elements 108 and 116 are integrally formed with the diaphragm by a process of etching and masking a silicon-on-insulator or other semiconductor wafer, as discussed in later paragraphs.

The sensor also includes an optional housing 110 that surrounds the diaphragm, the optical fiber, and the diaphragm support elements. In this example, the housing 110 is formed of concentric stainless steel tubes 112 and 114. The stainless steel tube 112 is affixed to the cylindrical support element 108 with an adhesive.

The housing can also be formed of other materials, such as Nylon, Delrin, hard plastics or other dielectrics. Dielectric materials are particularly suitable for surveillance or other applications which require pressure sensors or microphones which are difficult to detect.

The support element 116 is located at the side of the diaphragm that is exposed to the exterior environment, and can be a cylinder of approximately the same dimensions of the cylindrical support element 108. The support elements 116 and 108 protect the diaphragm and enhance the mechanical stability of the thin diaphragm material.

The diaphragm 106 can be planar, with a reflective surface or reflective coating 109 facing the optical fiber probe, and an opposite surface exposed to the exterior environment. The reflective coating can be gold, aluminum, or another reflective material suitable to be coated onto the diaphragm.

In operation, the exterior face of the diaphragm 106 is exposed to ambient environment. The diaphragm, the support element 108, the polished end of the optical fiber 102, and the inside wall of the housing form a cavity which is sealed from the exterior environment. Pressure differentials between the exterior environment and the internal cavity cause the silicon diaphragm to deflect slightly.

Light is transmitted from a light source (not shown) through the optical fiber, and exits the optical fiber end. Light is reflected by the reflective surface on the diaphragm back toward the optical fiber. The portion of the reflected light that enters the fiber is transmitted along the fiber to a beam splitter or coupler (not shown), which directs the light toward a photodetector (not shown). The amount of light received at the photodetector indicates the exterior pressure, as discussed in later paragraphs in more detail.

The light source can be an LED or other broadband light source, or can be a laser or other narrow band light source. A LED has the advantage of being lower cost. The optical fiber is preferably a multimode fiber.

In this example, the optical fiber has a numerical aperture of about 0.37, a 200 micron glass core, a plastic clad with a 230 micron outer diameter, and a Tefzel coating with an outer diameter of about 500 microns. The fiber is commercially available from OFS Specialty Photonics Division, headquartered in Avon, Conn. The optical fiber can be another fiber, including plastic. The sensor has an outer diameter of about 902 microns. Other suitable optical fibers have numerical apertures of greater or less than 0.37. For example, SFS100/110T fibers have a numerical aperture of 0.26.

The fiber end is well polished, to minimize back reflection at the gas-fiber boundary at the fiber end.

Figure 1B:
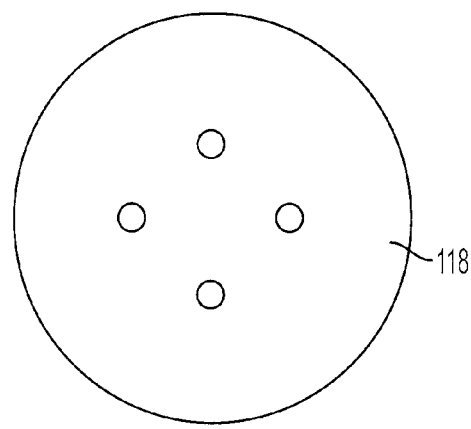
FIG. 1B-1C illustrate the sensor of FIG. 1A with a protective cap located over the sensor tip.
Figure 1C:
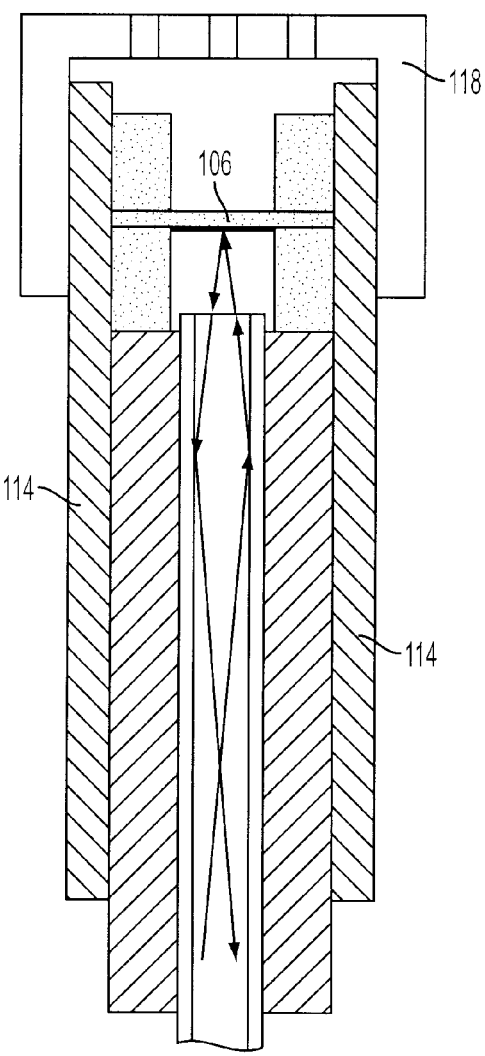

As shown in FIGS. 1B and 1C, the sensor can also include a protective cap 118, which has holes extending through the cap to allow the exterior ambient pressure to reach the exposed side of the diaphragm 106. The optional protective cap protects the diaphragm and end of the sensor from damage. The protective cap can have interior threads that mate with exterior threads on housing tube 114. The protective cap 118 can be the same material as the housing 114, for example, stainless steel, Delrin, Teflon, another hard plastic, or can be a different material.

Figure 2A:
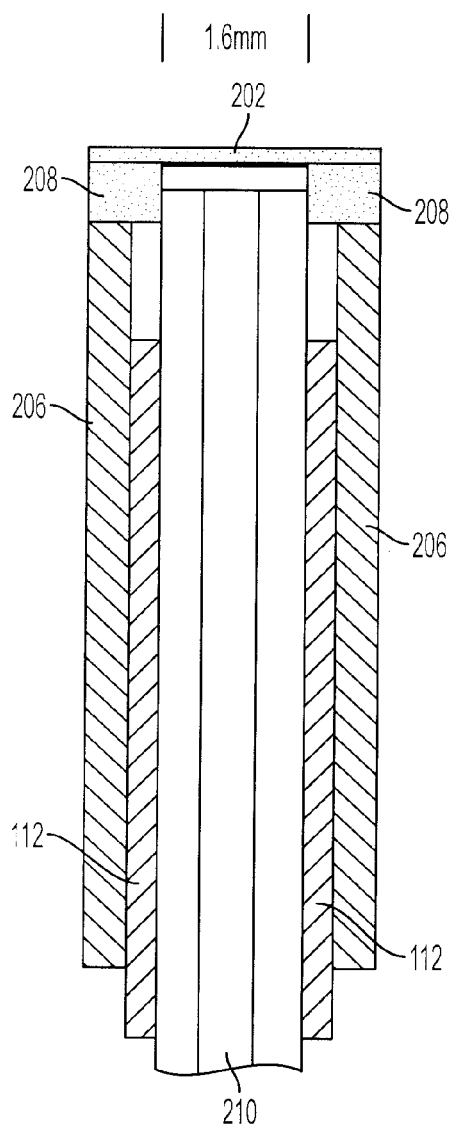
FIGS. 2A and 2B illustrate a pressure sensor with seven optical fibers including one centrally arranged transmitting fiber and six receiving fibers.
Figure 2B:
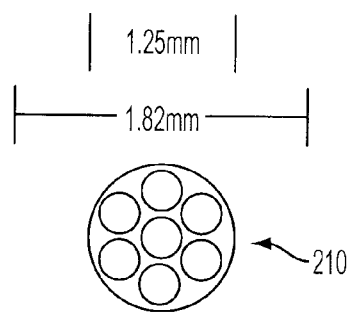

FIGS. 2A and 2B illustrate a pressure sensor 200 in accordance with another embodiment of the invention. In this embodiment, the fiber optic probe 210 includes a bundle of seven optical fibers, with one centrally arranged optical fiber for transmitting the light from the light source and six optical fibers surrounding the centrally arranged transmitting fiber for receiving a portion of the light reflected by the reflectively coated silicon diaphragm 202 and transmitting the received light to a photodetector (not shown).

The optical fibers can be multimode fibers with a numerical aperture of about 0.37, a 200 micron glass core, a plastic clad with a 230 micron outer diameter, and a Tefzel coating with an outer diameter of about 500 microns. The plastic clad is commercially available from HCS, Spectral Specialty Optics.

The fiber optic probe 210 of seven optical fibers has an outer diameter of about 1.25 mm. Two concentric stainless steel tubes protect the optical fibers. The diameter of the sensor, including both the optical fiber probe and the stainless steel tubes of the housing, is about 2.8 mm. The length of the sensor is about 13 mm, although it can be shorter or longer.

The housing includes two stainless steel tubes 204 and 206, which can be R-HTX-15 and R-HTX-12HW, respectively. The inner tube 204 has an inner diameter which is slightly larger than the outer diameter of the fiber bundle.

A cylindrical support element 208 is integrally formed with the diaphragm, as will be discussed in later paragraphs. The stainless steel tube 206 that forms part of the sensor housing is adhered to the cylindrical support element 208.

Figure 3A:
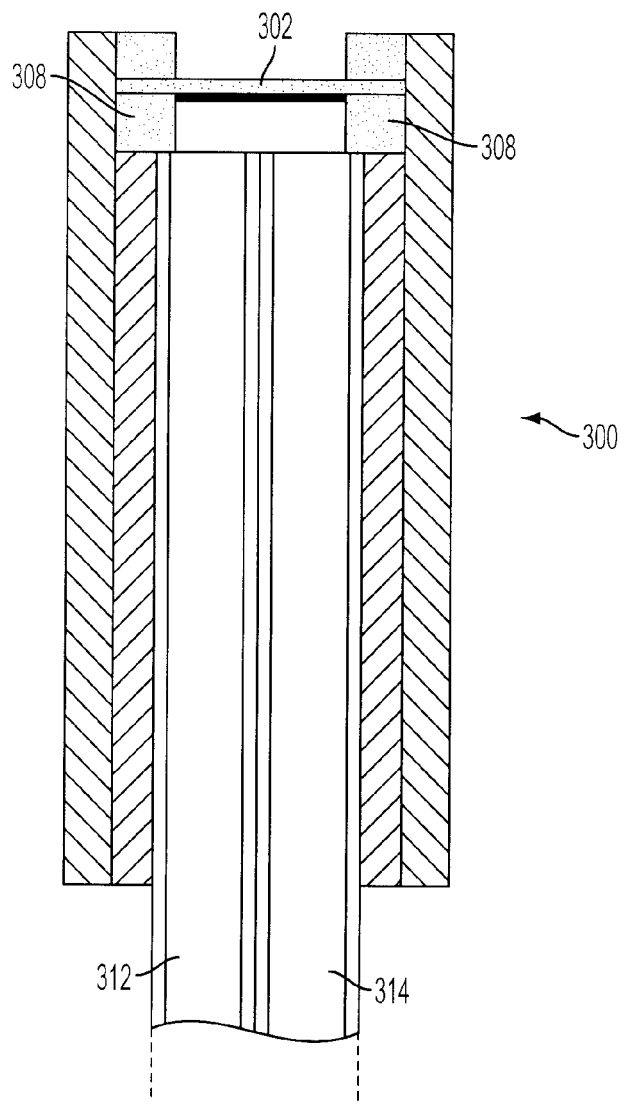
FIGS. 3A and 3B illustrate a pressure sensor with a fiber probe having two optical fibers, one for transmitting the light from the light source, and the other for receiving a portion of the light reflected by the silicon diaphragm.
Figure 3B:
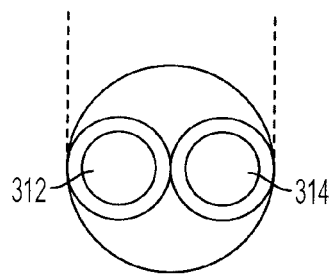

FIG. 3A and FIG. 3B illustrate a pressure sensor 300 in accordance with another embodiment of the invention. In this embodiment, the fiber optic probe includes two optical fibers 312 and 314, including a transmitting fiber 314 for transmitting the light from the light source, and a receiving fiber 312 for receiving a portion of the light reflected by a reflective coating on the diaphragm 302 and transmitting the received light to a photodetector (not shown).

The optical fibers 312 and 314 are preferably multimode fibers with a numerical aperture of about 0.37, a 200 micron glass core, a plastic clad with a 230 micron outer diameter, and a Tefzel coating with an outer diameter of about 500 microns. The plastic clad is commercially available from HCS, Spectral Specialty Optics.

The cylindrical support elements 116 and 108 protect the diaphragm 302 and enhance the mechanical stability of the thin diaphragm material.

In the one, two, and seven optical fiber sensors shown herein, the end of the optical fibers can be flush with the end surface of the cylindrical support element, or the end of the optical fibers can be closer to or further away from the diaphragm than the end face of the support element. Preferably, the distance between the fiber ends and the diaphragm's reflective surface is set to optimize the response of the sensor, as discussed further in reference to FIG. 6A-6H. While FIG. 2 shows the optical fibers sized so the end face of the cladding is in abutting contact with the end face of the cylindrical support elements, however, due to challenges in forming the support element with a uniform thickness, it can be preferable that the optical fibers are smaller in diameter than the inner diameter of the spacer, so the optical fiber end can be positioned based solely on the optimum sensor response, without regard for the thickness of the support element. The FIG. 3A-3B and FIG. 1A sensors are examples of sensors in which the optical fiber probe has a smaller diameter than the inner diameter of the support element, so the probe end does not contact the support element.

The diaphragm material is not limited to silicon. The diaphragm can be formed of another material capable of being formed at a thickness of about 1-2 microns with appropriate mechanical and material properties. Materials can also be chosen for compatibility with the human body.

FIG. 4A-4J illustrate an exemplary method for forming the diaphragm and support element.

Figure 4A:
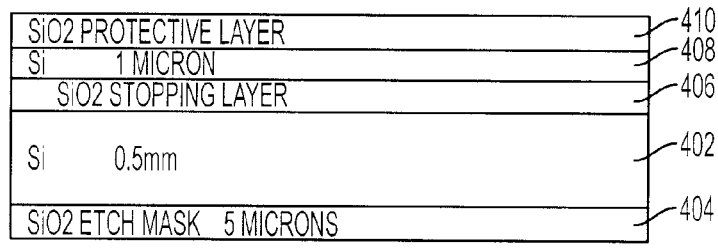
FIG. 4A-4L illustrate a method for forming the silicon diaphragm and support element for use in a fiber optic pressure sensor.

FIG. 4A is a cross sectional view of a portion of a silicon-on-insulator wafer approximately 4 inches in diameter.

The silicon-on-insulator (SOI) wafer is formed of a layer 402 of single crystalline silicon. On the front face of the silicon layer 402 is a silicon (silicon dioxide, $SiO_2$) stopping layer 406 approximately 1 micron thick and a thin layer of silicon 408 approximately 1.5 microns thick. The thin layer of silicon 408 will form the diaphragm of the sensor, and the thick substrate layer of silicon 402 will form the cylindrical support element for the diaphragm. The silica stopping layer 406 is also known as a buffered oxide (BOX) layer. The stopping layer 406 is a material that resists deep reactive ion etching, but is etched by the hydrofluoric acid wet etch.

The thickness of the thick silicon layer 402 is selected to be the desired final thickness of the support element. In this example, the thick silicon layer 402 is approximately 500 microns (0.5 mm) thick, although it can be thicker or thinner. Thicker support elements are preferable, in order to provide more support to the diaphragm.

The thick silicon layer 402 should be of a uniform thickness across a region that will include the support element for a diaphragm, in order to minimize stress in the diaphragm.

A protective layer of silica 410 approximately 1 micron thick is applied to the thin silicon layer 408, preferably by a plasma-enhanced chemical vapor deposition (PECVD) technique. A silica etch mask layer 404 is applied to the back face of the thick silicon substrate layer 402, preferably with the PECVD technique. The etch mask layer 404 is approximately 4-5 microns thick.

Figure 4B:
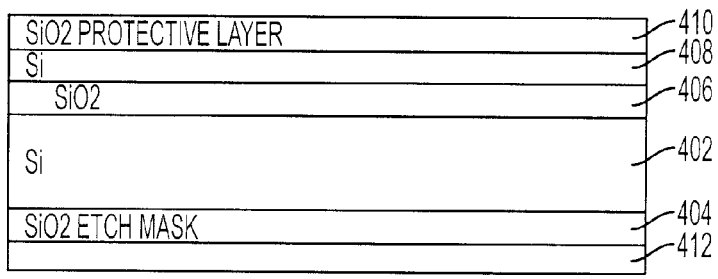

As shown in FIG. 4B, a photoresist polymer layer 412 approximately 5 microns thick is applied to the silica etch mask layer 404.

Figure 4C:
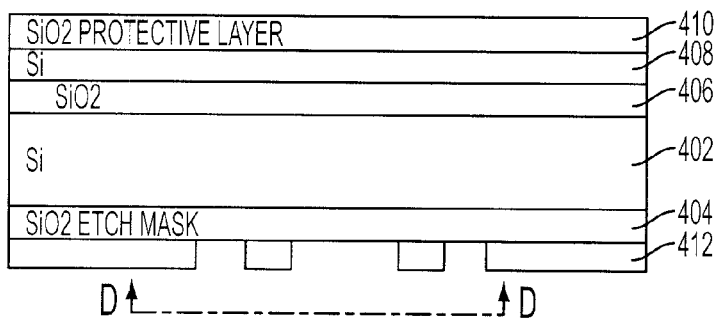
Figure 4D:
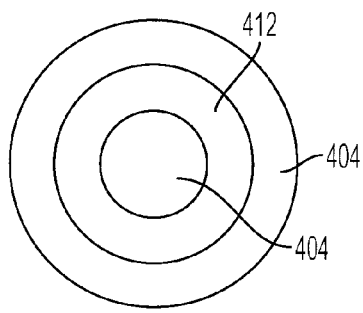

As shown in FIGS. 4C and 4D, the photoresist layer 412 is patterned using contact optical lithography. This lithography step forms circular openings in the back-side silica layer 404 to allow exposure of the silicon wafer 402 to a deep reactive ion etch (DRIE). The remaining oxide film in the silica etch mask layer 404 forms a high resistance mask which protects those parts of the wafer that are intended to form the frame of the diaphragm.

Figure 4E:
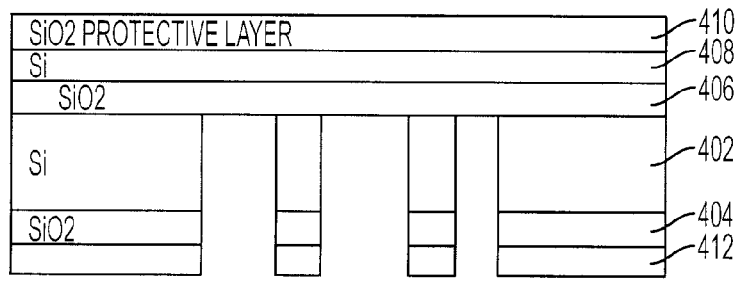

FIG. 4E illustrates a deep reactive ion etching of the silica etch mask layer 404 and the 500 micron silicon layer 402 to form circular openings in the silicon layer 402. The deep reactive ion etch is preferably a Bosch process featuring a high etch rate, very high anisotropy, and high sensitivity, where sensitivity is the ratio of the Si etch rate to the silica etch rate. This ion etch process etches cylindrical channels originating at the back side oxide layer 404, penetrates through the entire silicon wafer thickness, and stops at the bottom of the silica stopping layer 406. The DRIE will etch away a circular portion of the silicon layer 402, exposing a circular area in the stopping layer 406. The diameter of the exposed circular portion of the stopping layer 406 should match the desired diameter of the finished diaphragm. The channels can have nearly vertical walls, although the walls can also have an irregular profile.

The thin silicon layer 408, which is sandwiched between the silica stopping layer 406 and the silica protective layer 410, will form a diaphragm supported by the silicon cylindrical support element 414.

Figure 4F:
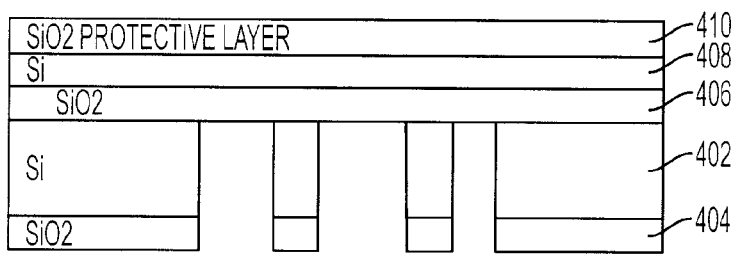
Figure 4G:
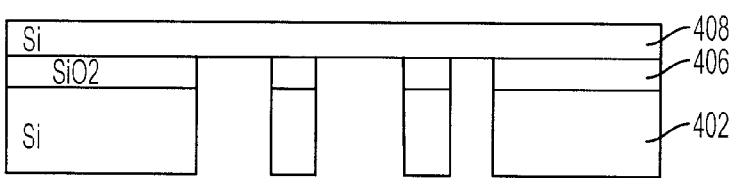

FIG. 4F illustrates the wafer after the photoresist layer 412 has been removed by cleaning the wafer with acetone. A short wet etch in hydrofluoric acid (HF) dissolves the exposed portion of the silica stopping layer 406 and the silica protective layer 410, exposing a relatively low stress single crystal diaphragm with a circular shape, as seen in FIG. 4G.

Figure 4H:
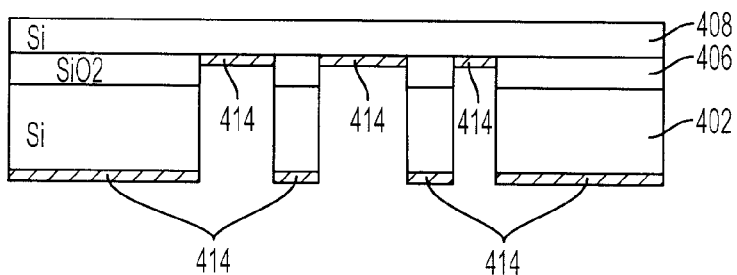

A reflective coating 414, such as aluminum or gold, can be evaporated onto the surface of the wafer after the diaphragm is exposed. As shown in FIG. 4H, the reflective coating can be evaporated onto the entire surface of the wafer so it coats both the exposed silicon diaphragm and the silica unetched portions of the wafer.

Figure 4I:
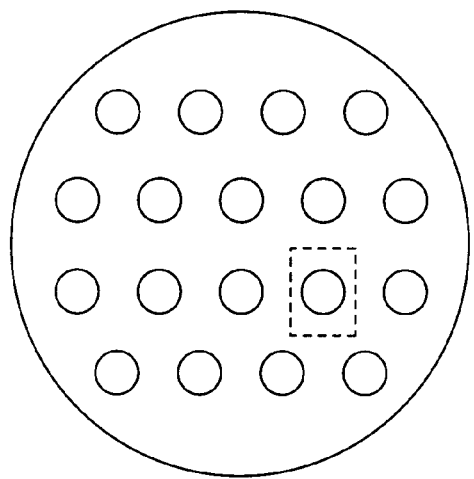

Note that the steps shown in FIG. 4A-4H are accomplished to produce a number of thin diaphragm regions on the wafer. FIG. 4I show a wafer with a number diaphragms resulting from these steps. Note that although only a few diaphragms are shown in this figure for clarity, however, hundreds of diaphragms or more can be formed of the same wafer. The diaphragms can be separated from each other by as little as one or two millimeters.

Figure 4J:
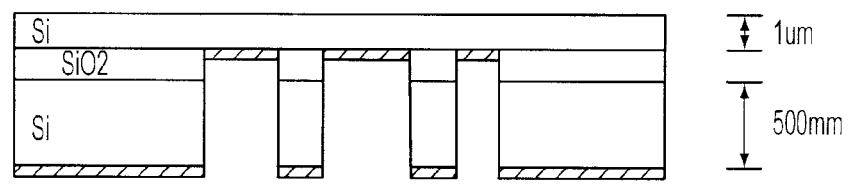
Figure 4K:
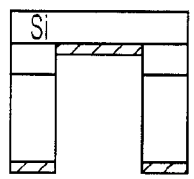
Figure 4L:
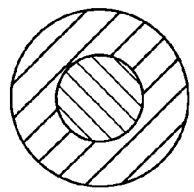

FIG. 4J shows the side view of a single diaphragm and support element formed by this process. FIGS. 4K and 4L show the integral diaphragm and support element after it has been broken away from the remaining portion of the wafer. The result is a circular silicon diaphragm supported at its outer edge by a cylindrical frame formed of the unetched 500 micron thick silicon wafer material. In subsequent steps, the diaphragm regions are individually broken away from the wafer and affixed to the optical fibers to form individual sensors, as shown in FIG. 6.

For subsequent steps, the wafer can be severed into several smaller portions, or can remain at its original size.

Figure 5A:
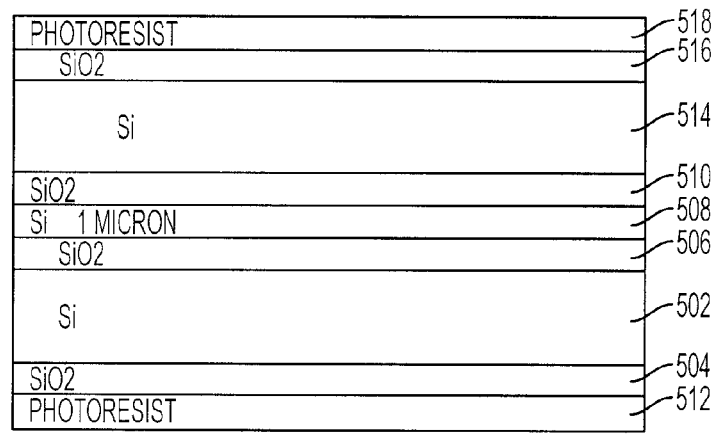
FIGS. 5A, 5B, 5C, 5D, and 5E illustrate a method for forming a diaphragm with a support element on both faces of the silicon diaphragm.
Figure 5B:
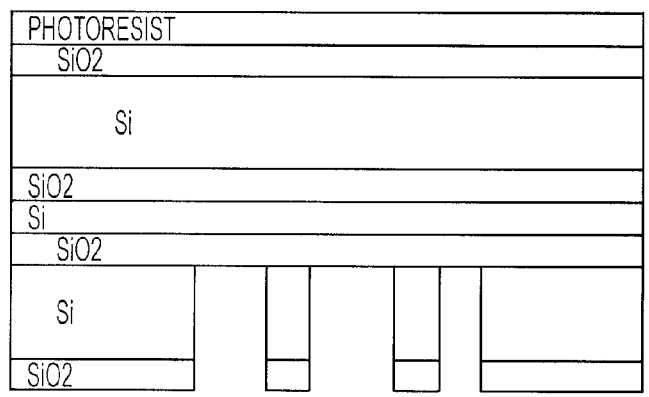
Figure 5C:
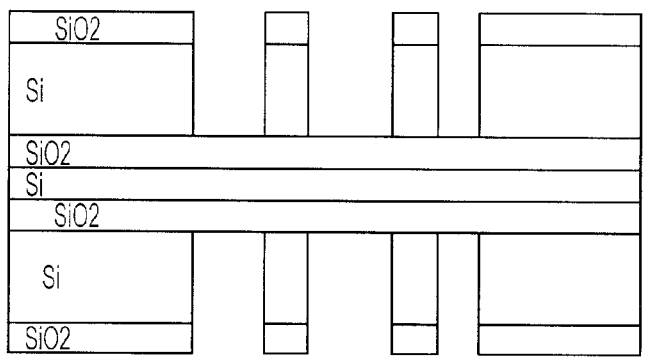
Figure 5D:
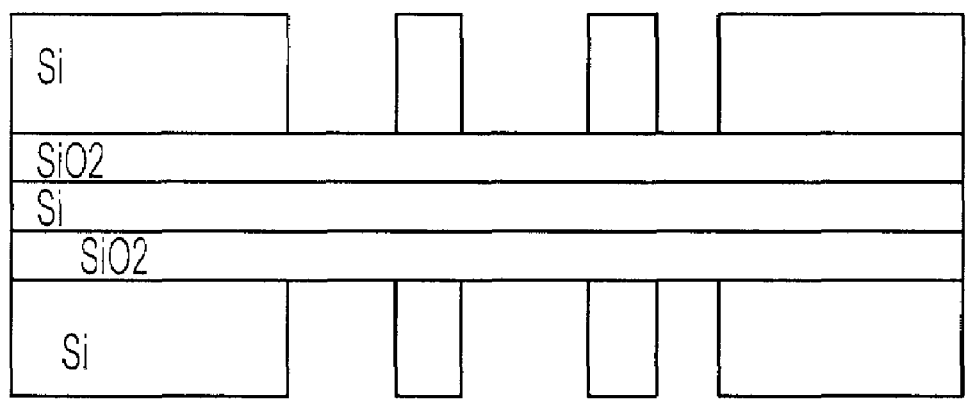
Figure 5E:
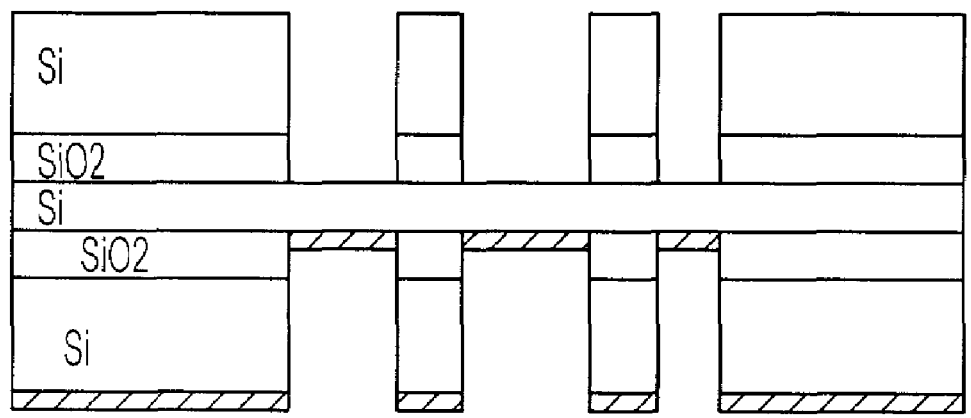

FIGS. 5A, 5B, 5C, 5D, and 5E illustrate a method for forming a diaphragm with a cylindrical support element, spacer or frame on both faces of the silicon diaphragm. The method is similar to the method shown in FIG. 4A-4J, and includes masking and lithography of the photoresist layers 512 and 518 to form circular openings in the layers 512 and 518, deep reaction etching of the SiO2 layers 504 and 516 and the thick silicon layers 502 and 514, cleaning with acetone, and a short wet etch in hydrofluoric acid to dissolve the exposed portion of the SiO2 layers 506 and 510. In a preferred embodiment, the masking and deep reactive ion etching is done one side at a time, as shown in FIGS. 5B and 5C, followed by cleaning both sides with acetone and the short wet etch of both sides to produce the resulting etched wafer in FIG. 5D. Subsequently, as shown in FIG. 5E, a reflective coating such as aluminum or gold is evaporated onto the side of the wafer intended to face the optical fibers in the pressure sensor.

FIG. 5F shows the resulting wafer, in top view. FIGS. 5G and 5H show the side view and top view of a cutaway portion of the FIG. 5F wafer, including a portion with a diaphragm with a reflective coating and the cylindrical support element.

Note that the examples shown herein describe the diaphragm as silicon, the stopping layer as silica (SiO2), and the thicker layer of the wafer as being silicon. However, it is also suitable to form the diaphragm and frame with different materials. For example, the diaphragm layer can be diamond, gold, or another thin reflective material that can be formed as part of a wafer. It is also suitable to select the material to be compatible with the intended purpose. For example, it is suitable to choose a material that is neutral or compatible with the human body or human blood.

FIG. 6A-6H illustrates a method for forming the fiber optic pressure sensor using the etched and coated wafer of FIG. 5D or 4I according to an exemplary embodiment of the invention. This example illustrates the steps for forming a sensor with seven fibers, including one transmitting multimode fiber and six surrounding receiving multimode fibers.

The fiber optic pressure sensor includes a housing which includes one, two, or three cylindrical tubes. In the example shown in FIG. 6A-6H, three stainless steel tubes form the housing. The inside diameter of the smallest tube should be slightly larger than the outer diameter of the fiber or fiber bundle which will be enclosed within the housing.

Figure 6B:
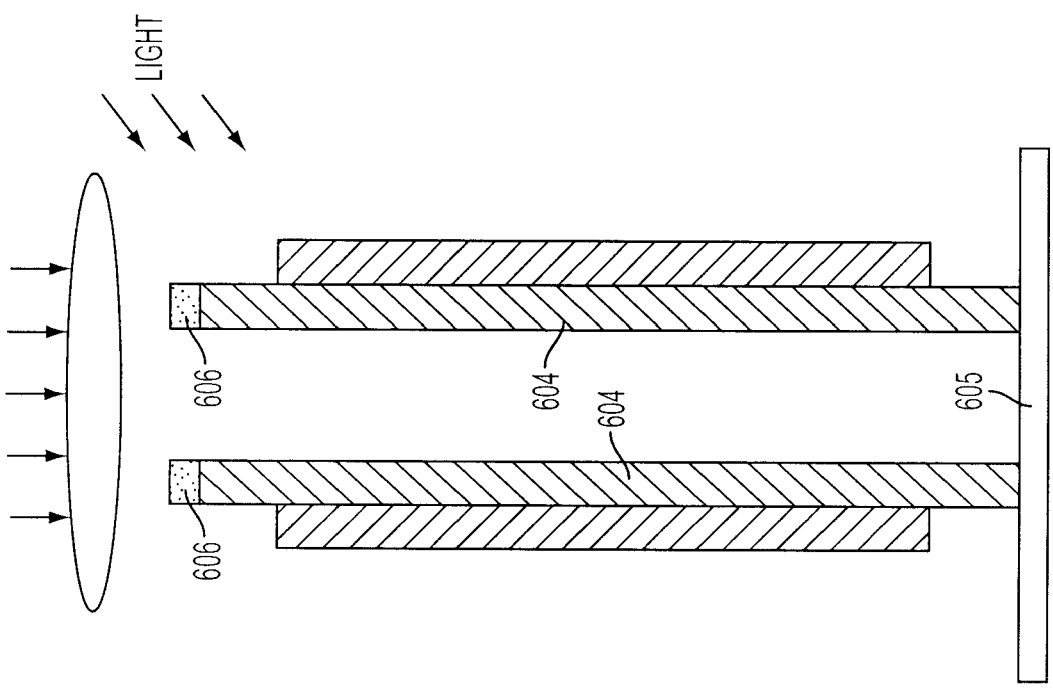
Figure 6A:
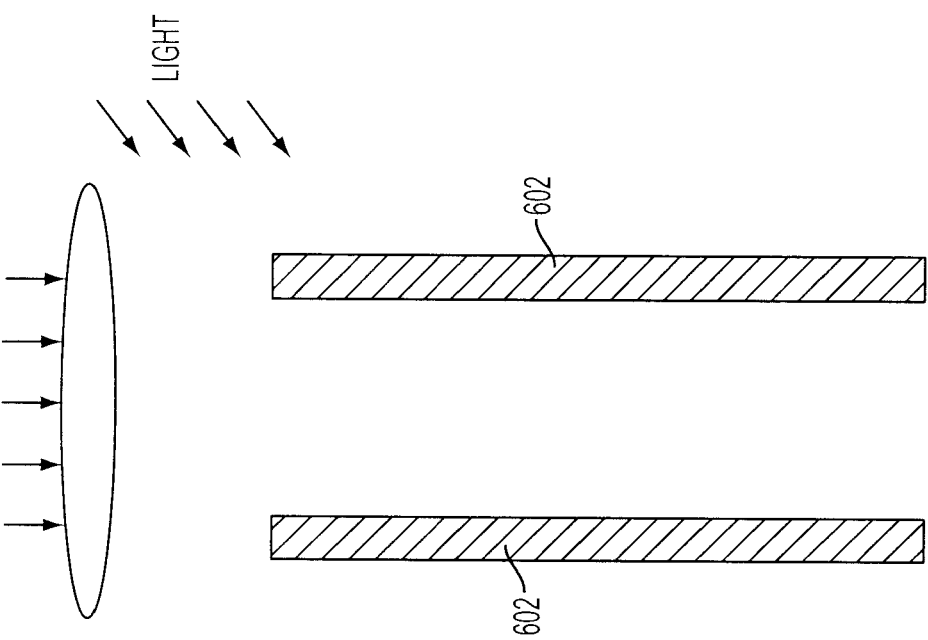
Figure 6F:
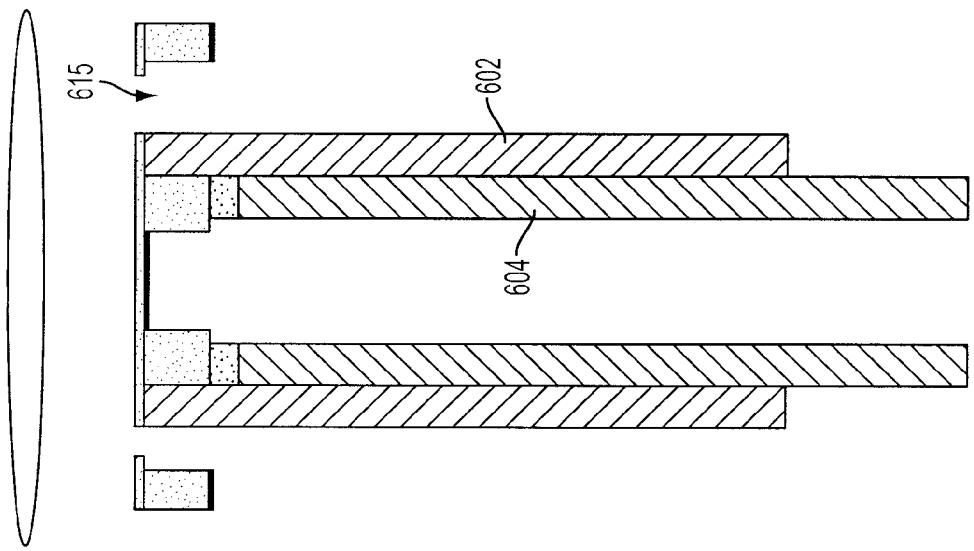

As shown in FIGS. 6A and 6B, a stainless steel tube 602 is mounted in a three-axis xyz controlled fixture that is movable in three directions. A microscope is focused on the upper edge of the tube 602. A second, smaller stainless steel tube 604 is gripped by another xyz controlled fixture. A uniform layer of epoxy is applied to the upper end of the tube 604. A uniform epoxy layer will prevent strain in the diaphragm, while an irregular epoxy layer can cause unacceptable strains in the diaphragm.

The smaller tube 604 is inserted into the larger tube 602, and transparent stopper 605 is held in place by another xyz controlled fixture below the smaller tube 604 so the smaller tube 604 does not drop through the larger tube 602.

Figure 6E:
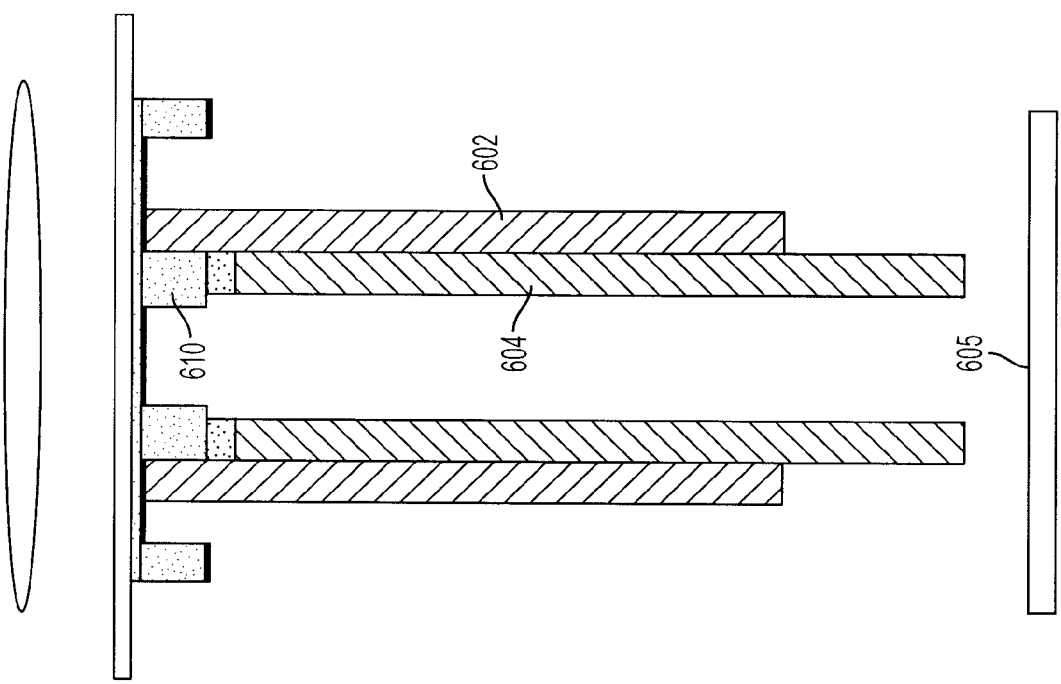

For steps shown in FIG. 6C-6E, the microscope is located above the upper end of the stainless steel tubes and a light source is positioned at the opposite end of the stainless steel tubes. With the edges of the silicon wafer 608 being supported on a movable microscope platform that can move in the x, y, and z directions, the silicon wafer is brought into position between the microscope lens 613 and the upper end of the tubes, and aligned so the wafer's cylindrical support element 610 is immediately above the epoxied end of the inner stainless steel tube 604, as seen in FIG. 6C.

A microscope slide 612 is brought into position above the silicon wafer 608, as shown in FIG. 6D. The microscope slide 612 holds the wafer in place while the tubes 604 and 602 are positioned against the wafer. The transparent stopper 605 is moved upward, pushing the smaller tube 604 upward until the uniformly epoxied end of the tube 604 contacts the cylindrical support element 610 of the wafer. It is important that the epoxy does not contact the diaphragm area, as epoxy would change the mechanical properties of the diaphragm.

As seen in FIG. 6E, the outer stainless steel tube 602 is then moved upward until it's end face contacts the silicon wafer 612 in the etched region radially outside the cylindrical support element 610. The microscope slide 612 allows the outer tube 602 to contact the etched channel in the wafer without introducing additional strain into the diaphragm. The outer tube 602 is epoxied to the inner tube 604 at the end of the tubes away from the wafer. After the epoxy has cured, the wafer is broken in a circle in the etched channel area of the wafer immediately outside of the tube 602.

Optionally, a third stainless steel tube 614 is then inserted inside the second tube 604. The inner diameter of the tube 614 is slightly larger than the outer diameter of the fiber probe which will subsequently be fit into the tube 614. The end of the third tube 614 can be set back somewhat from the end of the second tube 604, as shown in FIG. 6G. The stainless steel tube 614 is epoxied into place.

In this example, the outer stainless steel tube 602 is R-HTX-10TW tubing with an inner diameter of 0.114 inches and an outer diameter of 0.134 inches. The middle tube 604 is R-HTX-12TW with an inner diameter of 0.077 inches and an outer diameter of 0.109 inches. The third, inner tube 614 is R-HTX-15TW, with an inner diameter of 0.054 inches and outer diameter of 0.072 inches.

Figure 6H:
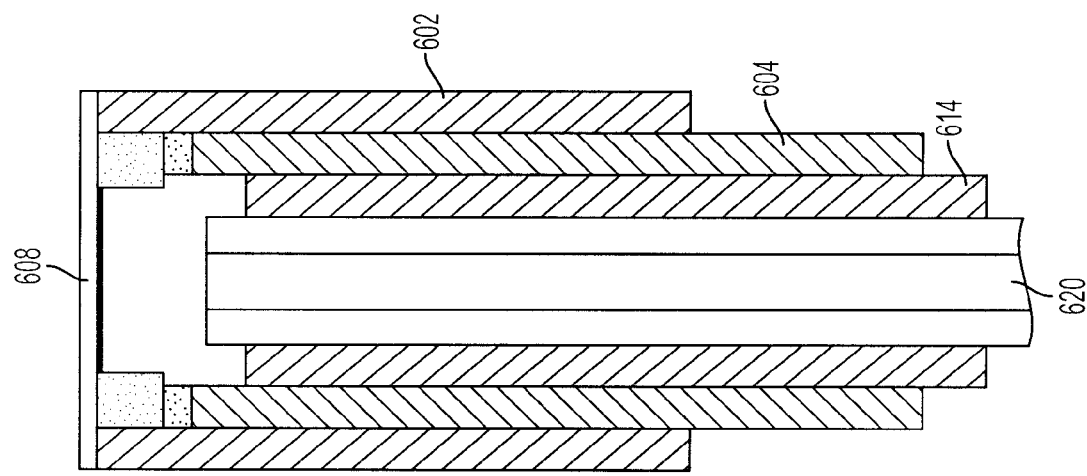
Figure 6G:
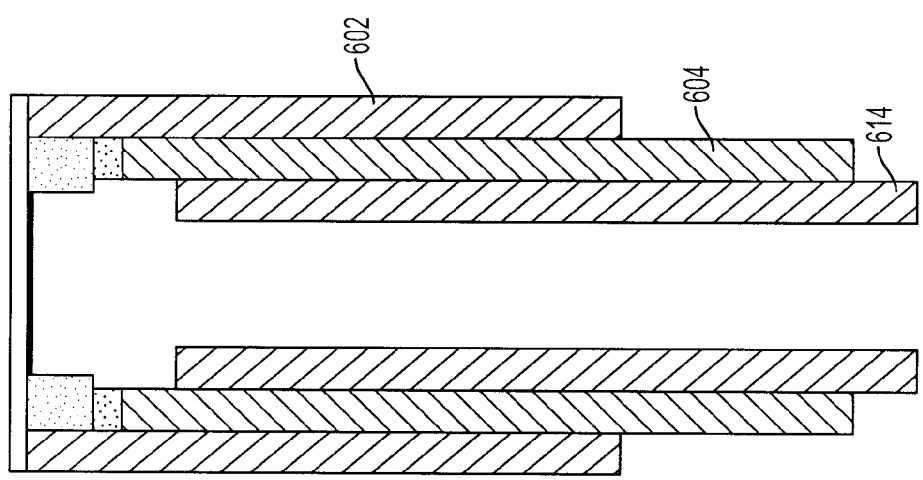

As illustrated in FIG. 6H, the fiber optic probe 620 is inserted into the innermost tube 614. If desired, or if needed to reduce the size of the optical fiber probe, any optical fiber coating can be stripped from the fiber clad before inserting the fibers into the tubes.

While the fiber optic probe 620 is inserted into the housing, light is transmitted through the transmitting fiber and the amount of light reflected by the diaphragm into the receiving fiber is monitored. When the amount of reflected light reaches a predetermined level, the fiber optic probe 620 and the third tube 614 are epoxied into place.

Note that while FIGS. 6G and 6H illustrate an embodiment in which three stainless steel tubes form the housing, embodiments of the invention can also include only two tubes 602 and 604, or only one tube 604. The inner diameter of the innermost tube should be slightly larger than the outer diameter of the fiber probe.

The remaining portion of the wafer has additional etched regions which can be used for forming other fiber optic sensor. After the wafer is broken, the steps in FIG. 6A-6H above can repeated for other diaphragm/frame sections of the wafer.

Another exemplary method is shown in FIG. 7A-7F for forming a two-fiber pressure sensor. Using two optical fibers in the optical fiber probe and only two stainless steel tubes produces a sensor with a smaller diameter than the seven-fiber sensor of FIGS. 2A-2B and 6H.

Figure 7B:
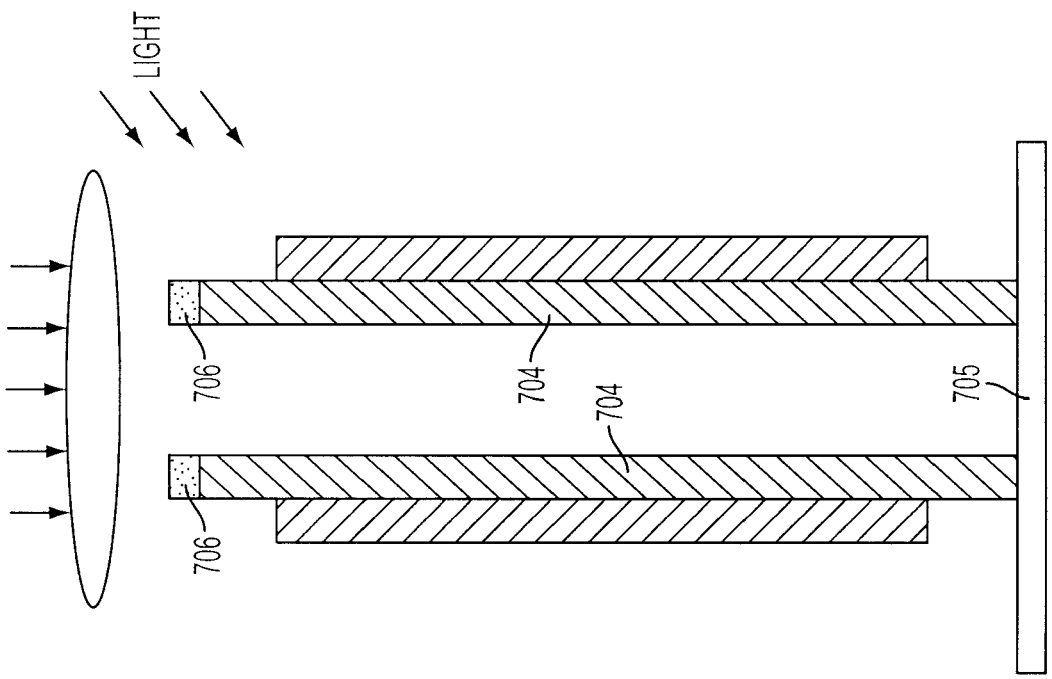
Figure 7A:
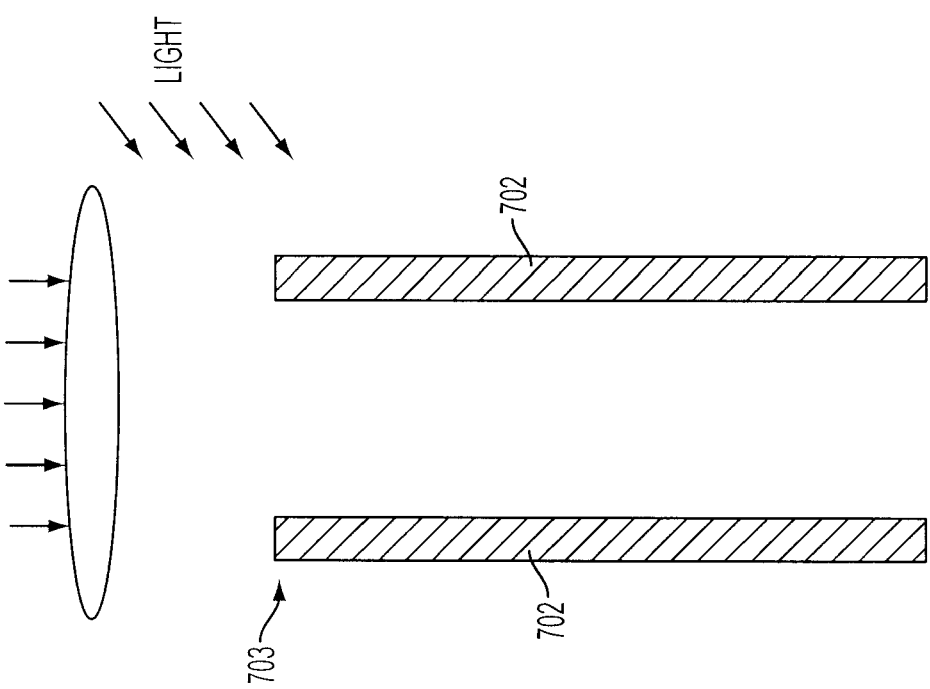

As shown in FIGS. 7A and 7B, a stainless steel tube 702 is mounted in a fixture which is movable in three directions. A microscope is focused on the upper edge 703 of the tube 702. A uniform layer of epoxy 706 is applied to the upper edge of a second, smaller stainless steel tube 704, and the smaller tube 704 is inserted into the larger steel tube 702. A transparent stopper 705 is positioned below the tube 704.

Figure 7F:
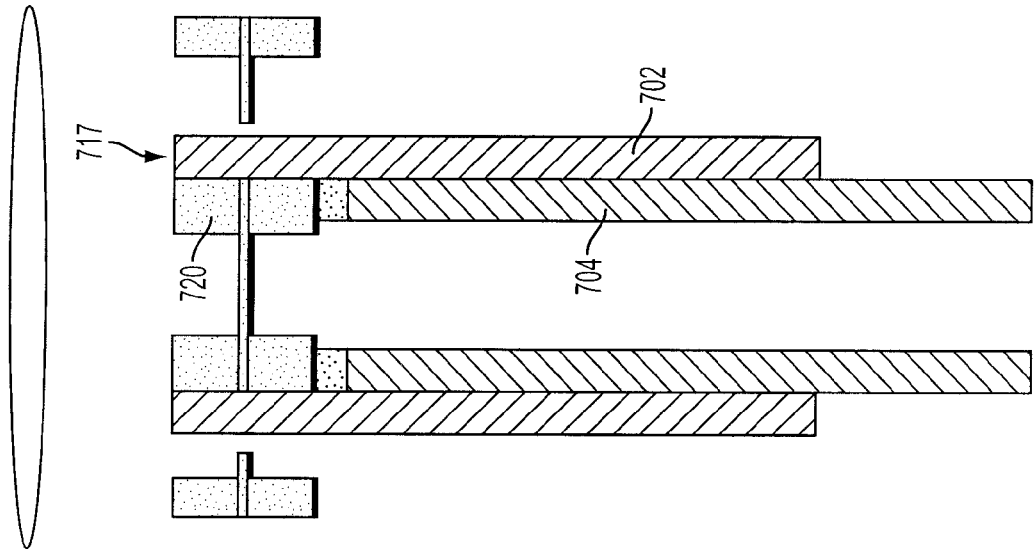
Figure 7E:
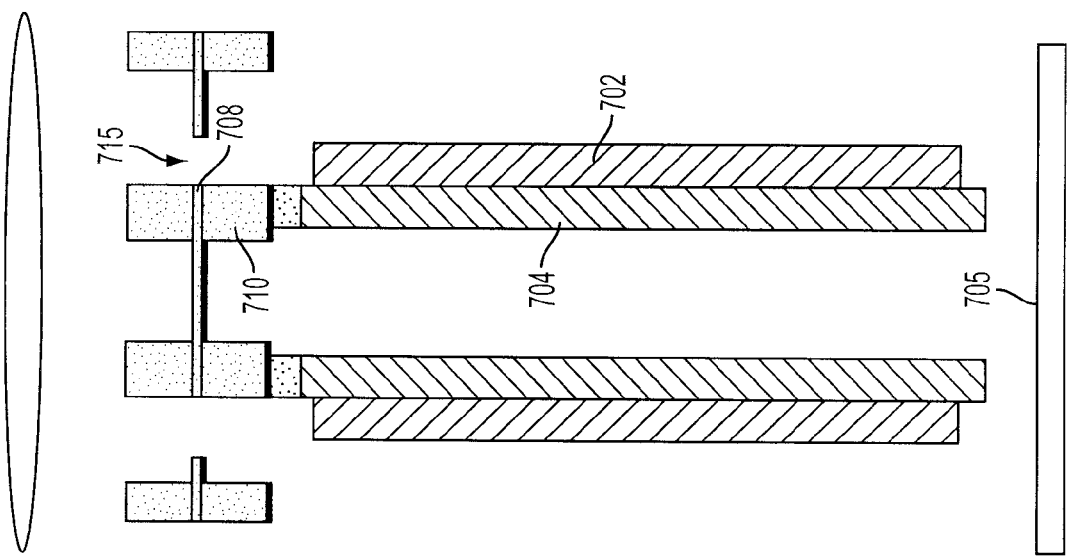

For steps shown in FIG. 7C-7E, the microscope is located above the upper end 703 of the stainless steel tubes and a light source is positioned at the opposite end of the stainless steel tubes. As shown in FIG. 7C, the wafer 708 that is formed using the technique of FIG. 5A-5D is positioned between the microscope lens and the stainless steel tubes. The edges of the wafer 708 are supported on a movable microscope platform that can move in the x, y, and z directions while the silicon wafer 708 is brought into position between the microscope lens 713 and the upper end of the stainless steel tubes. The wafer is aligned so the cylindrical support element 710 is immediately above the epoxied end of the inner tube 704. A microscope slide 712 is brought into position above the silicon wafer 708 to hold the wafer in position while the tubes are positioned against the wafer. As shown in FIG. 7D, the stainless steel tube 704 is moved upward using the transparent stopper 705 until the epoxied end of the tube 704 contacts the cylindrical frame 710.

As shown in FIG. 7E, after the epoxy has cured, the wafer 708 is broken in a circle immediately outside of the outer tube 704 in the circular etched channel 715 of the wafer.

As shown in FIG. 7F, the outer stainless steel tube 702 is brought upward until it's end face 717 is at least flush with the upper surface of the cylindrical support structure 720 on the opposite face of the diaphragm 708.

The two-fiber fiber optic probe is inserted into the innermost tube 704. If desired, or if needed to reduce the size of the optical fiber probe, any optical fiber coating can be stripped from the fiber clad before inserting the fibers into the tubes.

While the fiber optic probe is inserted into the housing, light is transmitted through the transmitting fiber and the amount of light reflected by the diaphragm into the receiving fiber is monitored. When the amount of reflected light reaches a predetermined level, the fiber optic probe is epoxied into place.

Figure 8A:
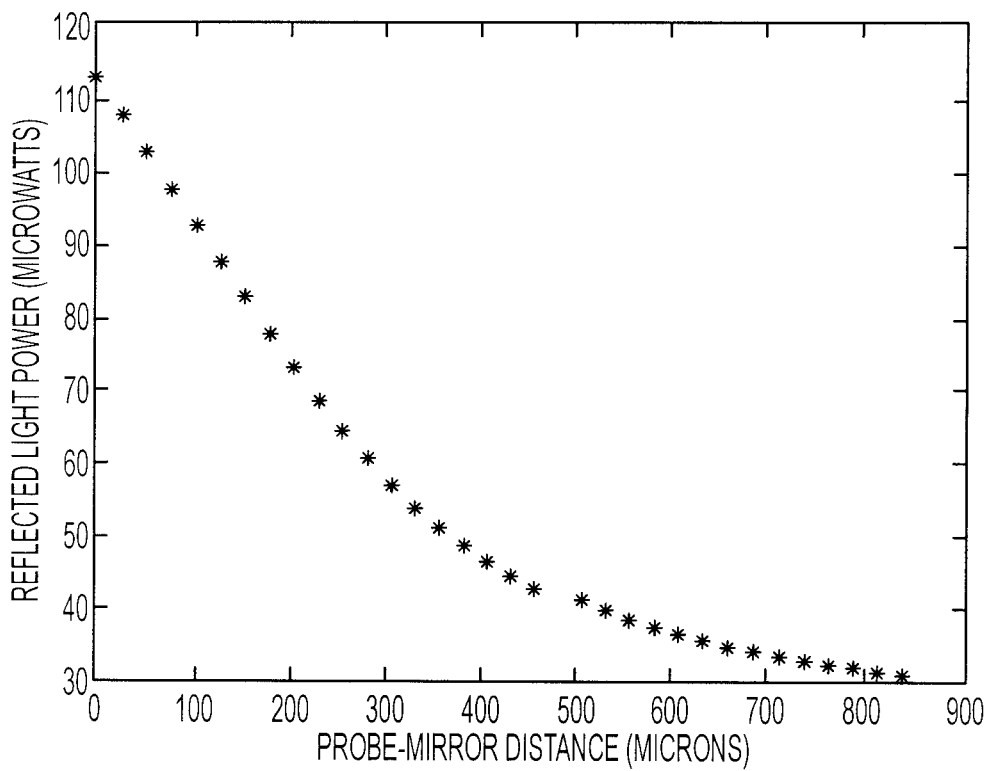
FIGS. 8A and 8B plot the reflected light power and the displacement sensitivity versus the distance between the polished end of the optical fiber and the reflecting surface for a one-fiber probe that is a component of the pressure sensor of FIG. 1.
Figure 8B:
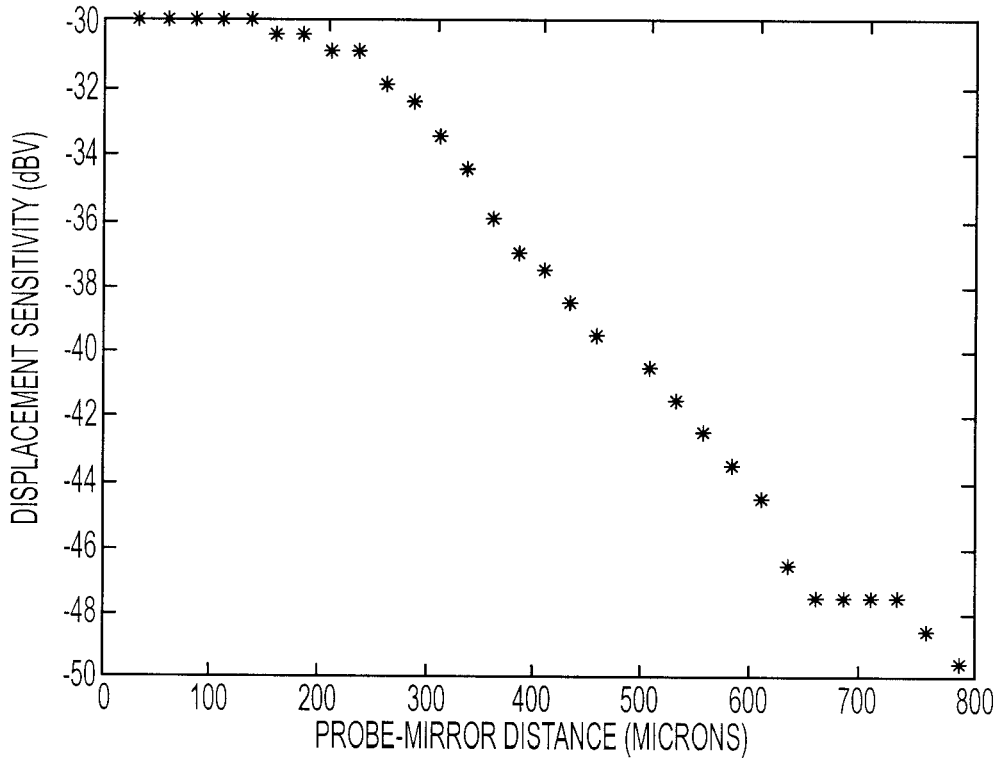

FIGS. 8A and 8B illustrate the dependence of the reflected light power and the displacement sensitivity on the distance between the polished end of the optical fiber and the reflecting surface for the one fiber probe that is a component of the FIG. 1A sensor.

Displacement sensitivity is studied by mounting the one fiber probe on a micrometer translator which is displaced manually against a mirror mounted on a piezoelectric transducer which can be vibrated electronically. The piezoelectric transducer is a PZT-4 cylinder of 2" outer diameter and 3" length. The probe is displaced against the mirror in steps of 25.4 microns using a micrometer translator. As seen in FIG. 8A, maximum displacement sensitivity occurs when the distance between the end of the optical fiber and the reflector is between zero and about 150 microns.

The one fiber probe is then dynamically displaced against the reflector by vibrating the PZT transducer electrically. The displacement amplitude of the vibrating reflector is obtained from the output of a small reference accelerometer model Endevco 2250A that is mounted close to the reflector. Results are shown FIG. 8B, which plots the ac displacement sensitivity as a function of the distance between the polished end of the optical fiber and the reflector. Sensitivity is maximum and approximately constant in the 0-150 micron range, in agreement with the dc displacement results shown in FIG. 8A. These results indicate that a good operating distance between the fiber end and the diaphragm for the one fiber pressure sensor is about 60 microns, with an acceptable range between zero and 120 microns.

Figure 9A:
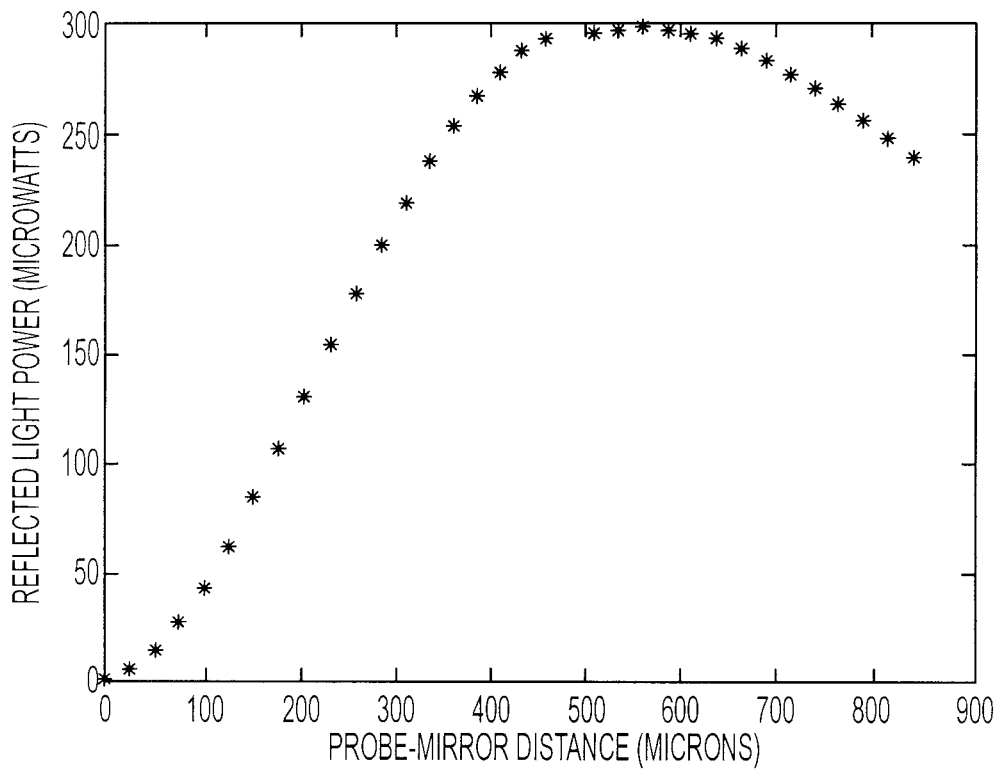
FIGS. 9A and 9B plot the reflected light power and the displacement sensitivity versus the distance between the polished end of the optical fiber and the diaphragm surface for a seven fiber probe that is a component of the pressure sensor of FIGS. 2A and 2B.
Figure 9B:
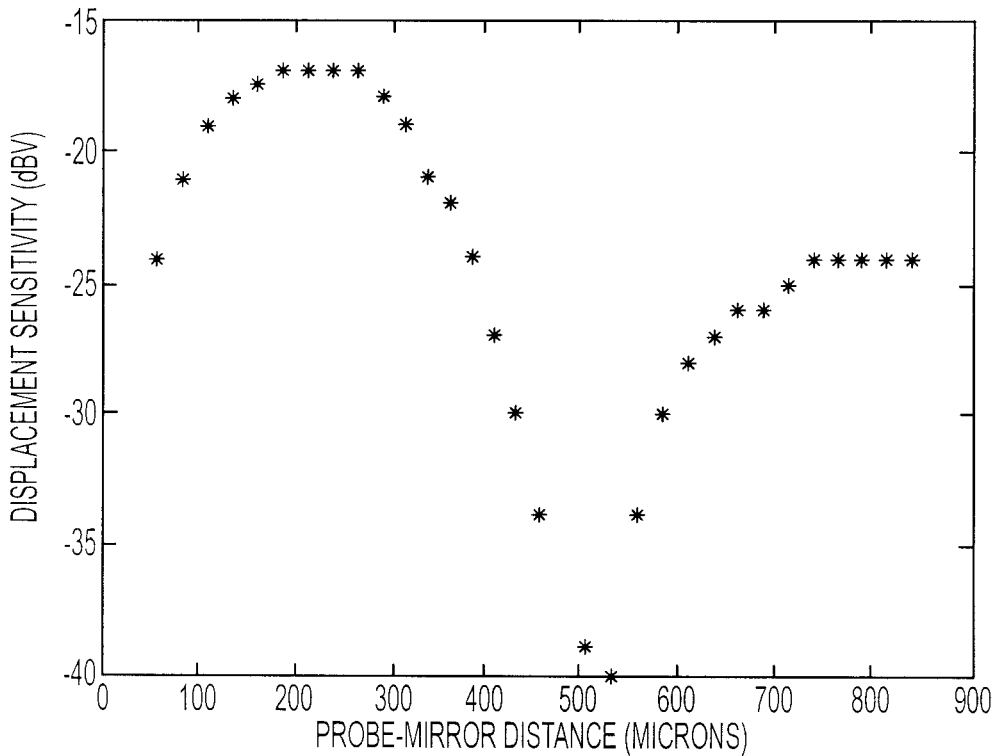

FIGS. 9A and 9B illustrate the dependence of the reflected light power and the displacement sensitivity on the distance between the polished end of the optical fiber and the diaphragm surface for a seven fiber probe that is a component of the pressure sensor of FIG. 2A-2B.

Note that the seven optical fibers are inserted into a stainless steel tubing with an outer diameter of 1.270 mm and an inner diameter of 0.838 mm by first stripping their coating using a stripper with a 305 micron diameter blade hole. After inserting the fibers into the tubing with the transmitting fiber surrounded by six symmetrically arranged receiving fibers, epoxy was applied to the fiber bundle. After the epoxy cured, the fibers were cut closely to the tubing end and polished very well.

The dc displacement sensitivity is studied by mounting the probe on a micrometer translator which is displaced manually against a mirror mounted on a piezoelectric transducer which can be vibrated electronically, as discussed above. The seven-fiber probe is dynamically displaced against the mirror by vibrating the PZT transducer electrically. The displacement amplitude of the vibrating mirror is obtained from the output of a small reference accelerometer mounted close to the mirror. By comparing FIG. 8A and FIG. 9A, it is seen that the seven fiber probe detects significantly higher light power after reflection from the reflector.

As seen in FIG. 9A, the maximum displacement sensitivity for the seven fiber probe occurs at a distance between the fiber end and the diaphragm of about 180-250 microns. The dc displacement sensitivity in this range is 9.38×10-11 Watts/Angstrom. As seen in FIG. 10, the ac displacement sensitivity is achieved at a distance range of about 180-250 microns. Therefore, an optimum distance between the fiber end and the diaphragm is about 220 microns. Note that the distance between the optical fiber end and the reflector can be set outside of the 180-250 micron range, however, the displacement sensitivity will be less. In applications in which a higher reflected light power is more important than sensitivity, the distance between the optical fiber end and the reflector can be selected to be in the approximately 600 to 800 micron range.

By comparing FIG. 9A and FIG. 8A, it is also seen that the smaller distances (0-150 microns) that provide good sensitivity for the one fiber probe do not provide good sensitivity for the seven fiber probe. The seven fiber probe must be at a larger distance from the diaphragm to produce maximum sensitivity. It is also seen that the maximum ac displacement sensitivity of the seven fiber probe is about 13 dB higher than the maximum ac displacement sensitivity.

The displacement sensitivity of the seven fiber probe can be calculated based on the amount of light received by the PIN photodetector and the reference accelerometer and was found to be $6.35 \times 10^{-11}$ Watts per Angstrom. This displacement sensitivity is slightly less than the sensitivity ($9.38 \times 10^{-11}$ W/A) found from the dc displacement experiment. In general, these results show that the displacement sensitivity is approximately the same across a range from the minimum detectable displacement to the displacements used in the dc experiment (0.1 mm). The dynamic range of the seven-fiber probe is approximately eight orders of magnitude.

The minimum detectable displacement was obtained by using a OPF 370A Optek LED driven at 100 mA current by a LDX-3620 Lightwave Technology power supply used in the battery operated mode. The detector was a TIA-500 Terahertz Technologies Inc. PIN detector, the output of which was stored into a 3582A HP spectrum analyzer. The fiber optic probe signal obtained with a known mirror displacement was compared to the noise which was the signal obtained with the mirror stationary. From that comparison the minimum detectable displacement was found to be 0.1 Angstroms/$(Hz)^{1/2}$. This minimum detectable displacement is limited primarily by the noise of the LED and its current source. Note that a good PIN detector can detect a fraction of a picoWatt ac signal. The minimum detectable displacement, for a system limited only by the detector noise, is 0.01 Angstroms.

Figure 10A:
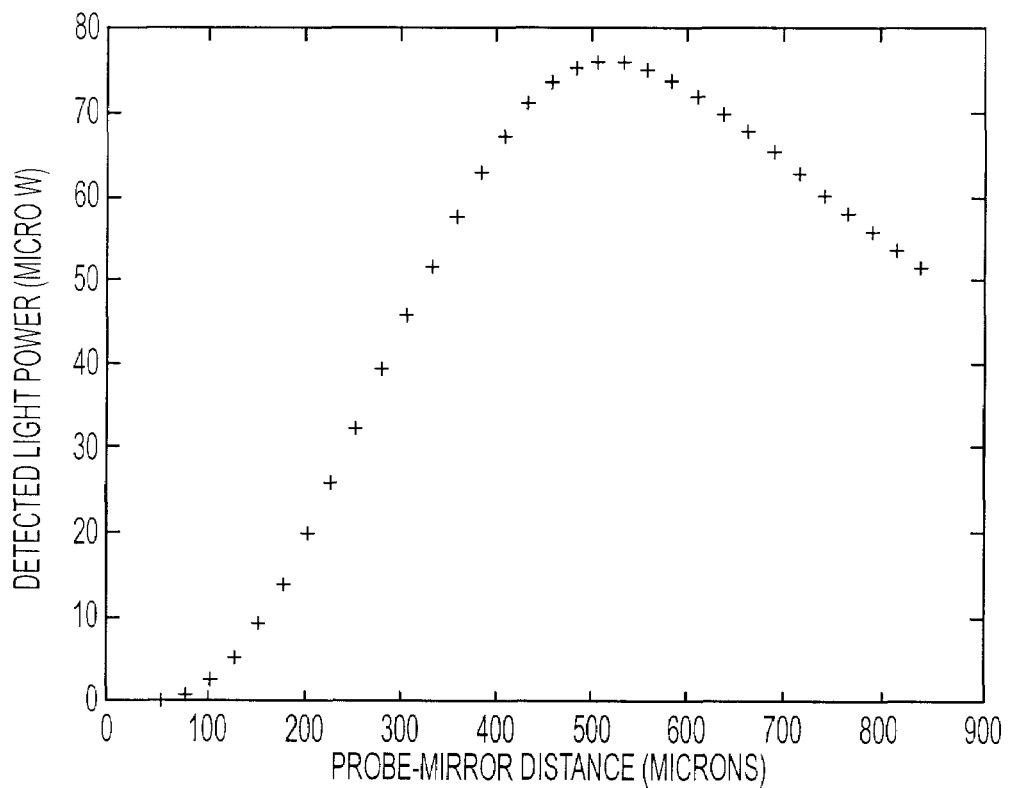
FIGS. 10A and 10B plot the reflected light power and the displacement sensitivity versus the distance between the polished end of the optical fiber and the diaphragm surface for the two fiber probe that is a component of the pressure sensor of FIG. 3A-3B.
Figure 10B:
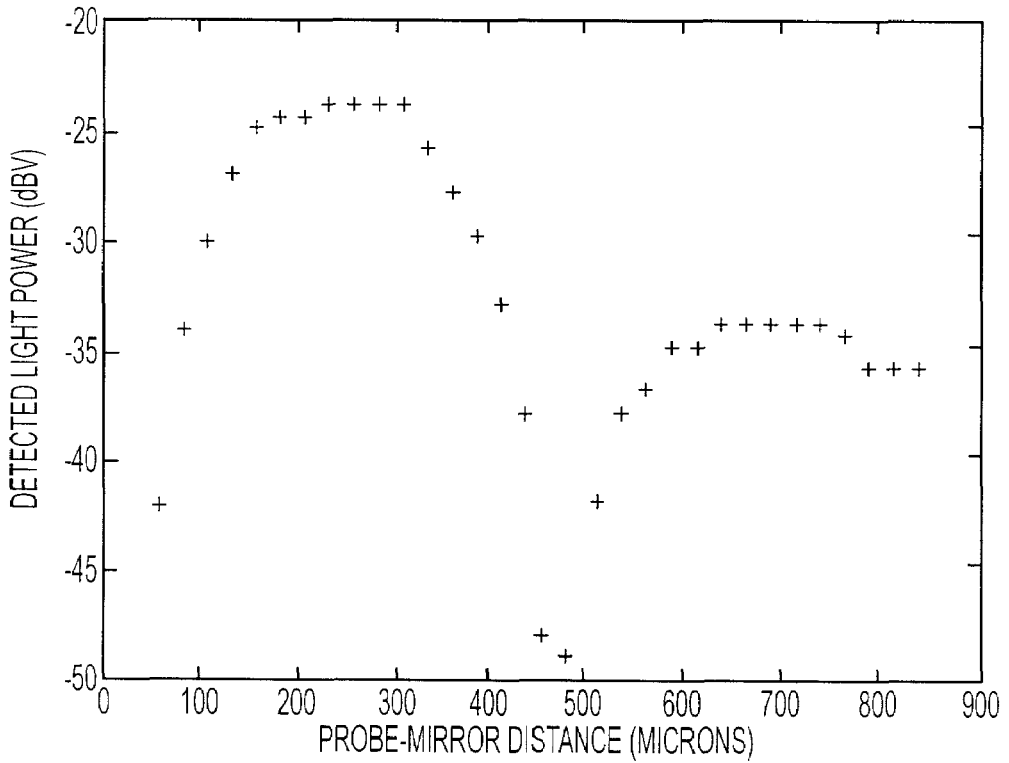

FIGS. 10A and 10B illustrate the dependence of the reflected light power and the displacement sensitivity on the distance between the polished end of the optical fiber and the diaphragm surface for the two fiber probe that is a component of the pressure sensor of FIG. 3A-3B.

The displacement sensitivity of the two fiber probe is similar to the sensitivity of the seven fiber probe. By comparing FIG. 10B with FIG. 9B, it is apparent that the sensitivity of the two fiber probe is about 7.5 dB lower than the sensitivity of the seven-fiber probe.

Figure 11:
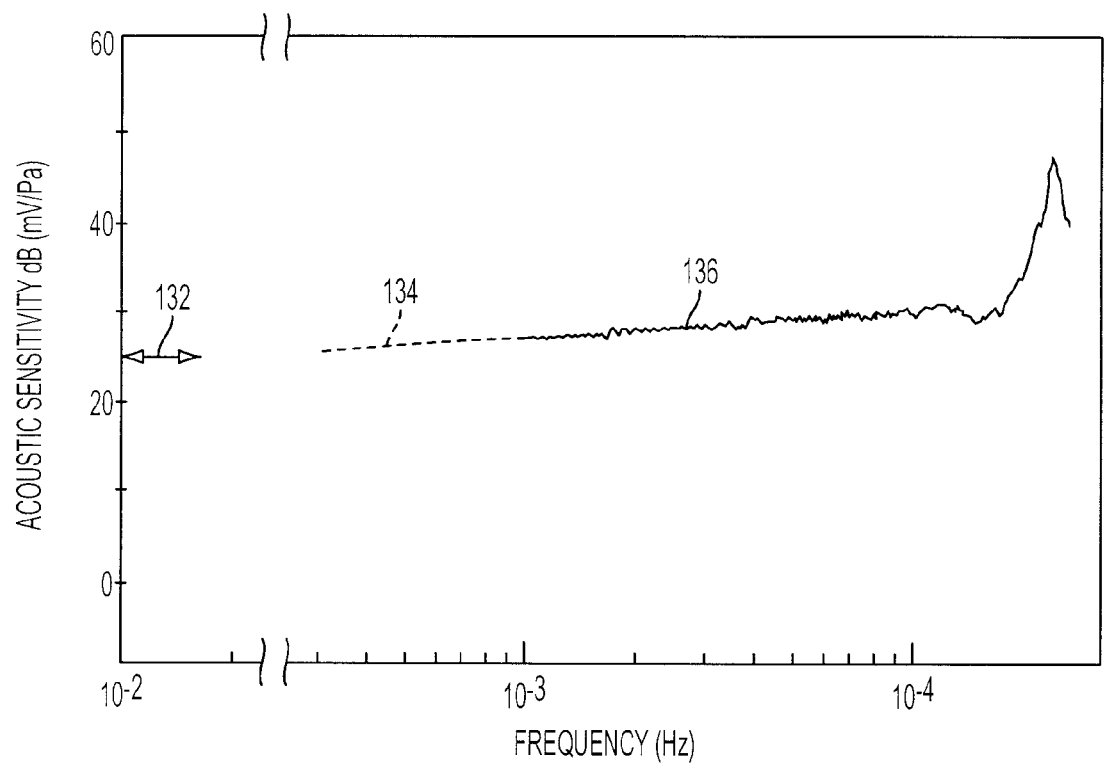
FIG. 11 illustrates the fiber optic pressure sensor response measured from 30 Hz to 25 kHz.

FIG. 11 illustrates the fiber optic pressure sensor response measured from 30 Hz to 25 kHz. FIG. 11 illustrates three different measurements, a pseudostatic, a low frequency, and a high frequency.

A pseudo-static response 132 is determined by measuring the change in optical signal over about a 100 second period to changes in pressure. This measurement applied water height changed in a 6.4 mm inner diameter plastic tubing to which the microphone diaphragm end was attached.

Low frequency measurements 134 were made over the 30 Hz to 1000 Hz frequency band by placing the sensor in a Bruel and Kjaer pressure sensor model 4221 with a standard calibration microphone. The microphone is a Bruel and Kjaer 4938 sensor with a B&K 2669 preamplifier and a B&K 2690 amplifier. A broadband chirp pulse covering the band was applied to the calibrator, and the output signals from the fiber optic and calibration microphones were recorded and stored in a Macintosh computer using a ML 750/M Power Lab recorder.

High frequency measurements 126 were made over the 900 Hz to 25 kHz range. The sound source, a high fidelity loudspeaker, was mounted on a pedestal and the fiber optic pressure sensor (microphone) was attached to a vertical supporting rod. Both the source and the fiber optic microphone were positioned so the nearest reflecting surfaces in the room were at least 1.5 meters away. The loudspeaker was driven with a gated sinusoidal signal, whose duration was sufficiently short so that the direct sound signal from the speaker to the microphone could be separated in time from the echoes from surrounding reflecting surfaces. The fiber optic pressure sensor was removed after recording the sound signals, and was replaced by the B&K calibration microphone to record the absolute pressure levels for calibration of the fiber optic pressure sensor response.

Figure 12:
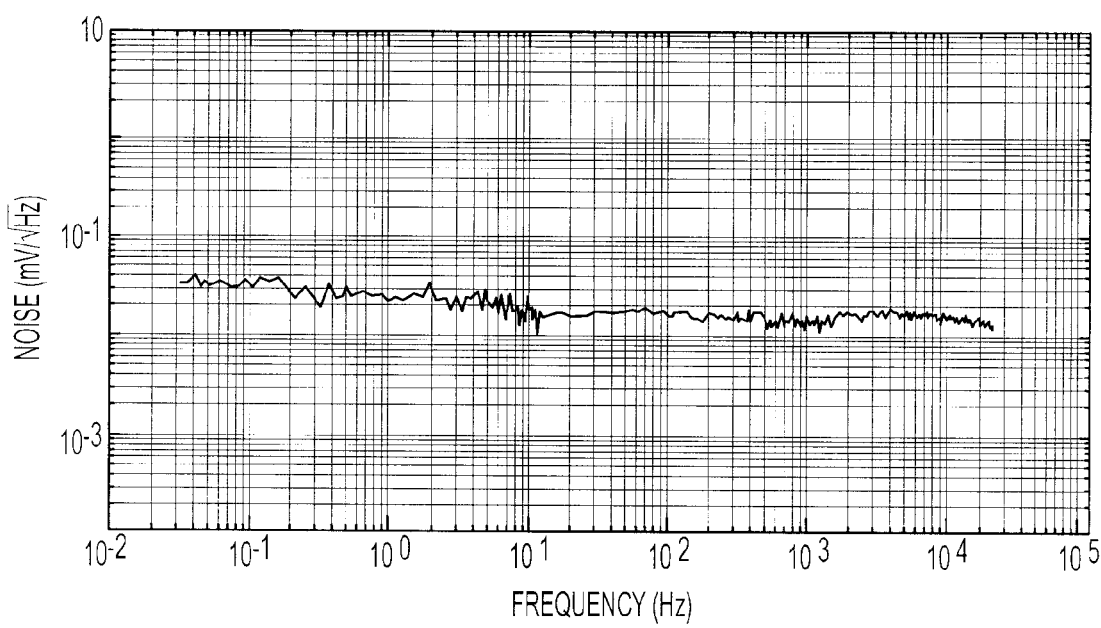
FIG. 12 illustrates the intrinsic noise level of the microphone as recorded in a quiet room over a wide range of frequencies.
Figure 14:
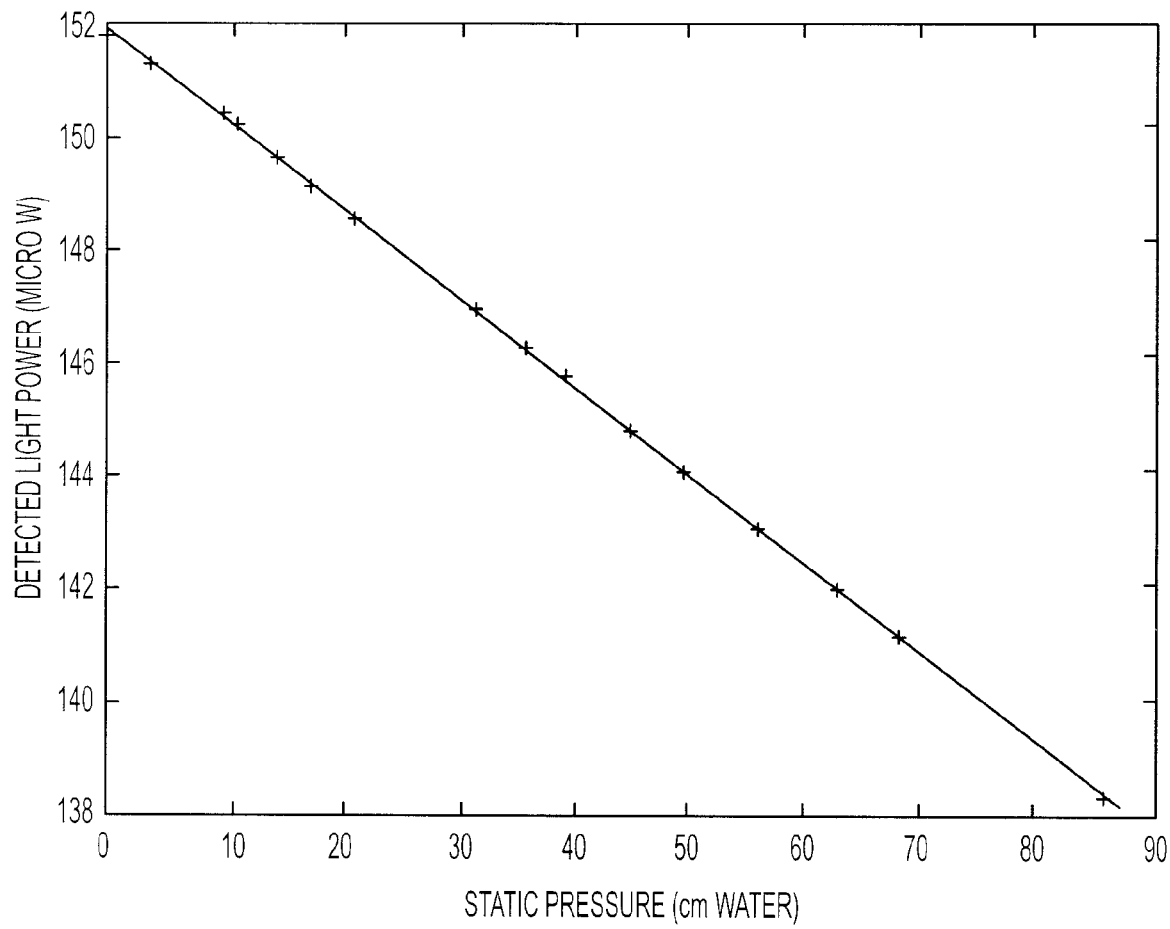
FIG. 14 is a graph illustrating the results of measuring static pressure with the technique shown in FIGS. 13A and 13B.

FIG. 12 illustrates the intrinsic noise level of the microphone as recorded in a quiet room over a wide range of frequencies. A quiet room is considered one with ambient acoustic levels of less than 100 micropascals. In FIG. 14, the rms noise level is plotted in units of optical power mV/(Hz)^½. The rms noise level can be converted to units of Watts/Hz^½ by dividing the optical power value by $1.1 \times 10^6$ Volts/Watt photodetector amplification value of the detector package. Similarly, the acoustic sensitivity in dB (mV/Pa) in FIG. 11 can be converted to Watts/Pa by dividing the value in mV/Pa by the photodetector amplification.

Note that the noise is nearly constant over a wide range of frequencies. Because the sensor has low noise at low frequencies, it is suitable for static and low frequency applications, such as for use in pressure catheters for human bodies. The pressure sensors are also suitable for sensing dynamic pressure changes and for use as microphones.

Figures 13A, 13B:
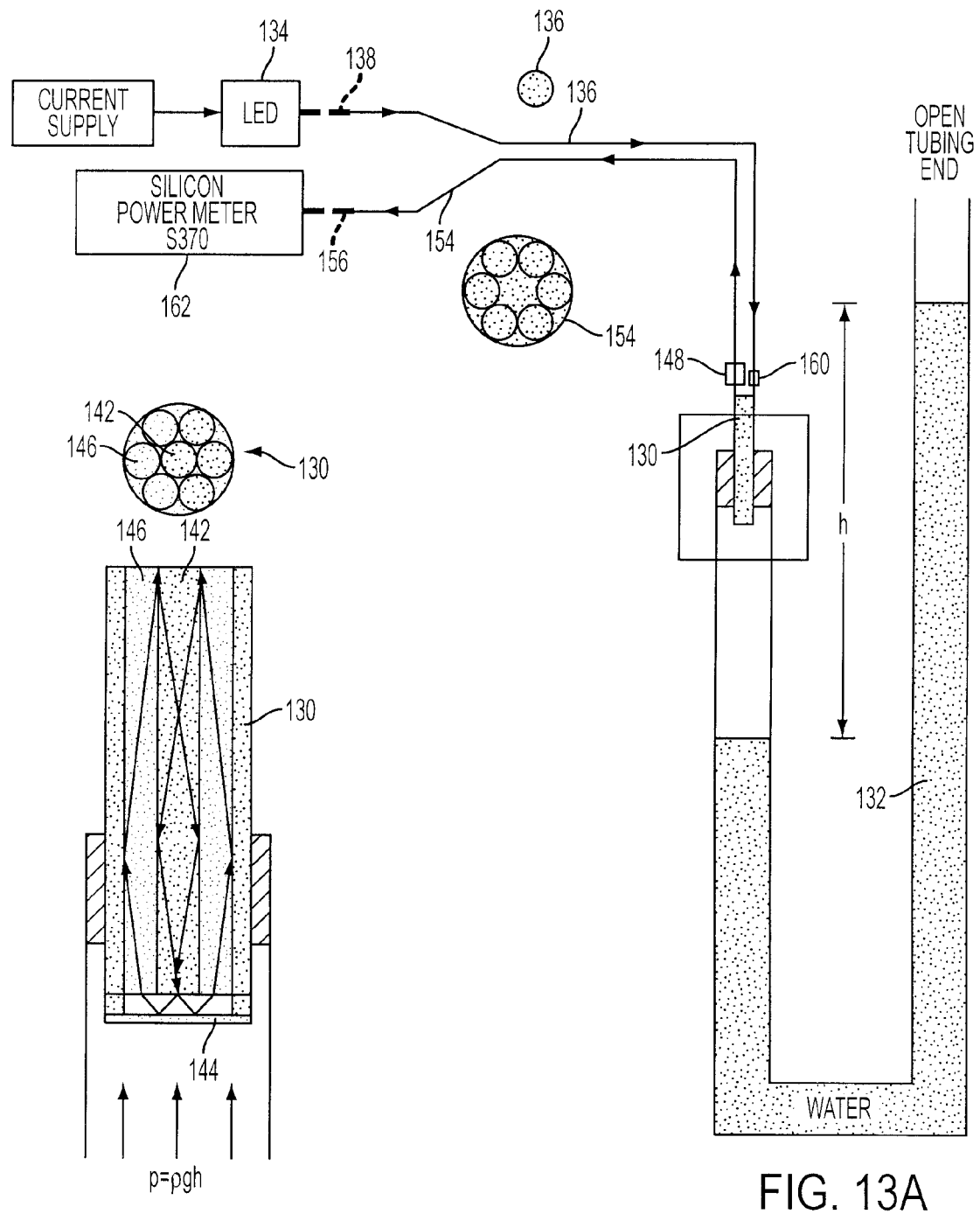
FIGS. 13A and 13B illustrate the experimental set-up for measuring static pressure sensitivity for the seven fiber pressure sensor of FIGS. 2A and 2B.

FIGS. 13A and 13B illustrate the experimental set-up for measuring static pressure sensitivity for the seven fiber pressure sensor of FIGS. 2A and 2B.

The multi-fiber optic pressure sensor 130 in accordance with FIG. 3A-3B is placed in a closed end of a liquid-filled plastic U-tube manometer 132, with an opposite end of the U-tube manometer open to the atmosphere. The exterior of the sensor 130 is subjected to a pressure corresponding to the height difference h between the levels of the two liquid columns of the manometer, with h being proportional to the pressure p relative to the atmospheric pressure at the open end of the tube and to the density $\rho$ of the fluid in the manometer 132 according to the equation $p=\rho gh$.

An optical source 134 such as a light emitting diode is coupled to a transmitting fiber 136 through connectors 138 and 160. As seen in FIG. 13B, light travels from the polished end of the transmitting fiber 142 a short distance to the silicon diaphragm 144. The light is reflected by the diaphragm toward the receiving fibers 146 that are arranged around the transmitting fiber 142. A portion of the reflected light is received by the receiving fibers 146, and is transmitted through the receiving fibers via connectors 148, a length of optical fiber 154, through another pair of connectors 156, and into a power meter 162. The intensity of the light received by the power meter corresponds to the static pressure p to which the sensor 130 is subjected.

FIG. 14 is a graph illustrating the results of measuring static pressure with the technique shown in FIGS. 13A and 13B. The detected light power in microwatts is linearly related to the static pressure in centimeters water over the measured pressure range. The static pressure sensor sensitivity measured with the manometer of FIGS. 13A and 13B about equal to the ac sensitivity of the sensor measured using the ac techniques described above. Thus, the fiber optic pressure sensor is suitable for both dynamic or static pressure sensing, with excellent accuracy and stability.

Figure 15A:
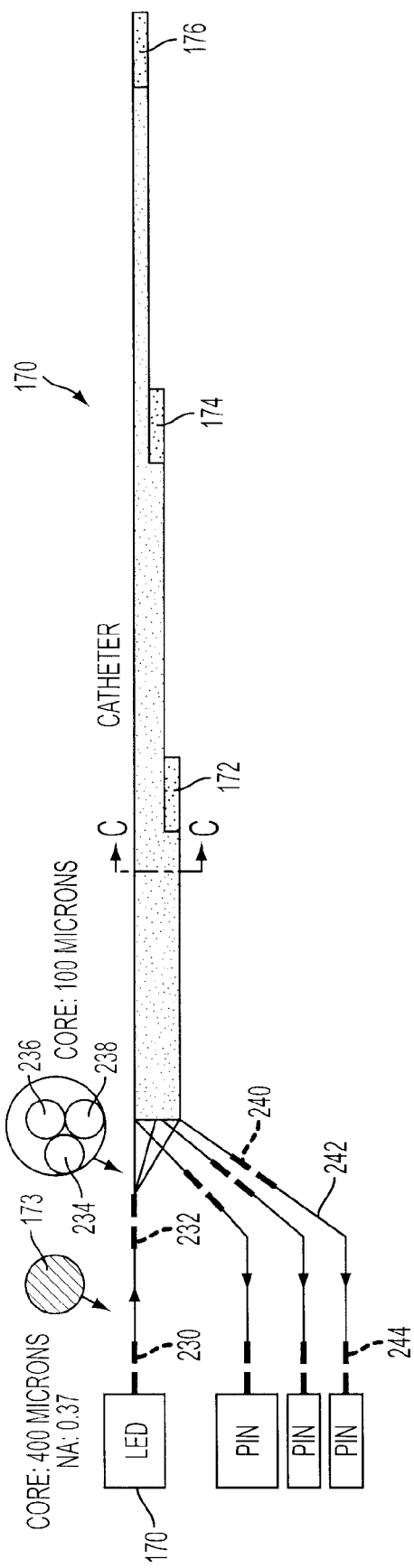
FIG. 15A-15D illustrate a catheter system with multiple fiber optic pressure sensors for use in a cardiovascular system.
Figure 15B:
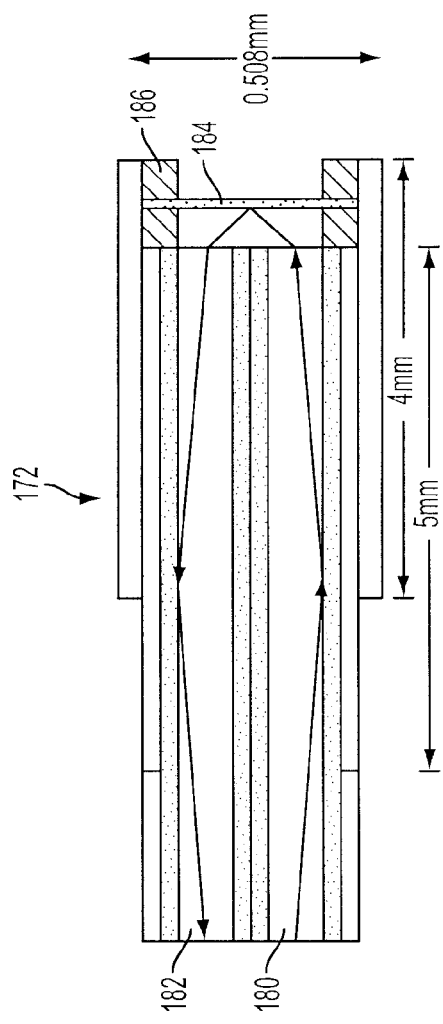

FIG. 15A-15D illustrate a catheter system 170 with multiple fiber optic pressure sensors. In this example, three pressure sensors 172, 174, and 176 are located at different locations along the catheter, corresponding to different locations in the human body. FIG. 15B is a cross-sectional view of pressure sensor 174, which includes a two fiber probe with optical fibers 180 and 182, a silicon diaphragm and frame, and a stainless-steel tube based housing.

As shown in FIG. 15B, each optical fiber is a SFS100/110T multimode fiber, with a core outer diameter of 0.1 mm, a clad outer diameter of 0.11 mm, and a polyimide coating outer diameter of 0.13 mm. The fiber coating is stripped from the portion of each fiber which will be inserted into the stainless steel tube. The ends of the fibers are polished very well before insertion into the tube. A two-fiber pressure sensors have a small diameter of about 0.5 mm, and the two 0.11 mm fibers together have a greatest dimension of about 0.22 mm. This small size allows numerous sensors to be included within the same catheter, and provides better sensitivity than a one-fiber pressure sensor. Additional details of two-fiber pressure sensors are discussed in paragraphs addressing FIG. 2A-2B.

Catheter systems can also include some or all one-fiber sensors, such as that shown in FIG. 1A, or seven-fiber sensors, such as that shown in FIG. 3A-3B. However, the larger size of the optical fiber bundle necessary for the seven-fiber sensor limits the number of seven-fiber sensors that can fit within a catheter for use in the human body.

One of the stainless steel tubes 188 is R-HTX-28, with an outer diameter of 0.355 mm and an inner diameter of 0.178 mm, drilled to a diameter of 0.225 to receive the optical fibers. The second stainless steel tube 190 is R-HTX-25, with an outer diameter of 0.508 mm and an inner diameter of 0.254 mm, drilled to 0.357 mm to receive the other stainless steel tube.

The diaphragm 184 and spacer 186 can be formed with the process shown in FIG. 4 or FIG. 5. In this embodiment, the single crystal silicon diaphragm 184 is approximately 1 micron thick, with a diameter of 0.20 mm. The cylindrical silicon spacer 186 is approximately 0.357 mm in diameter, about the same diameter as the inner stainless steel tube 188.

Figure 15C:
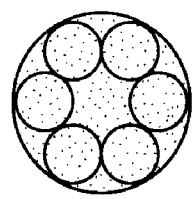

A cross sectional view of the fiber arrangement in the catheter 170 is shown in FIG. 15C. One light emitting diode (LED) 171 supplies three optical fibers 234, 236, and 238, via a multimode fiber optical fiber having a 400 micron core, and connector pairs 230 and 232. Connector pair 232 couples light from the larger diameter multimode optical fiber 173 into three multimode optical fibers 234, 236, and 238. The three multimode optical fibers 234, 236, and 238 transmit light to the catheter's three two-fiber pressure sensors 172, 174, and 176. Light that is reflected by the diaphragms in each pressure sensor is transmitted through the catheter's receiving fibers 182, via connectors 240, optical fibers 242, and connectors 244 to a PIN photodetector.

In an embodiment of the invention, the catheter is expendable after use in a patient. The fiber optic connector pairs 232 can connect the three optical fibers that transmit light from the LED and three of the fibers in the catheter, and fiber optic connector pairs 240 can connect the three optical fibers that transmit light to the PIN detector and the other three fibers in the catheters. After use, the catheter can be discarded, and the light source, photodetector, and associated optical fibers can be reused.

Figure 15D:
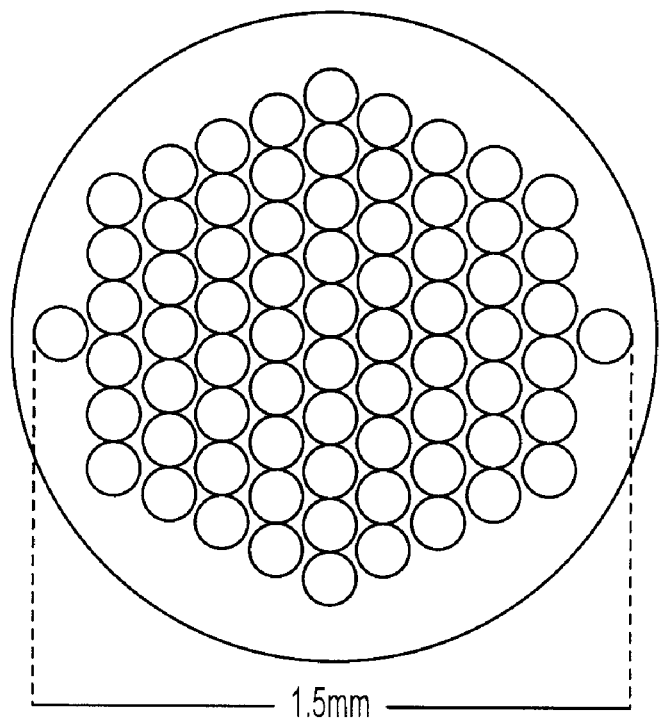

Although the catheter 170 is shown with three pressure sensors for clarity, as shown in FIG. 15D, a catheter with a diameter of 1.5 mm can include up to 72 optical fibers, which support 36 two-fiber pressure sensors.

In an exemplary embodiment, the catheter 194 is coated with a flexible biocompatible film that covers the catheter components, including the diaphragms of the pressure sensors. The film is intended to minimize any allergic or chemical reaction in the patient. The film can be applied by vacuum forming the film around the catheter system including the optical fibers and sensors.

Figure 16A:
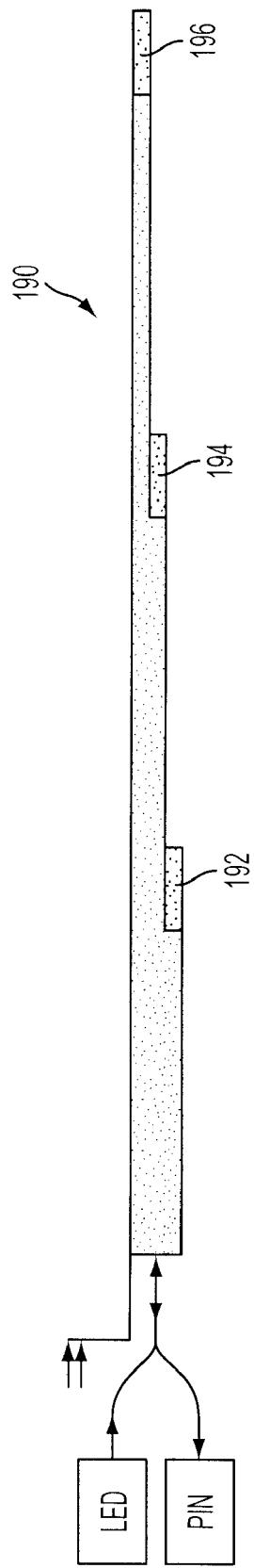
FIG. 16A-16C illustrate a catheter system with multiple fiber optic pressure sensors.
Figure 16B:
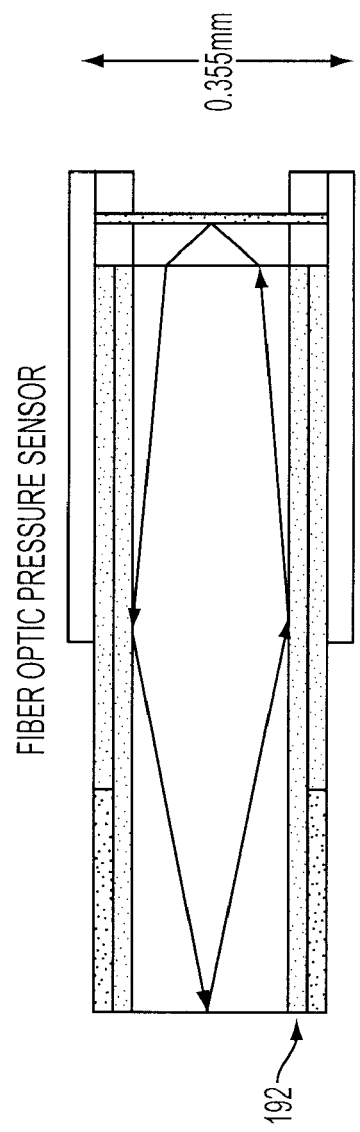
Figure 16C:
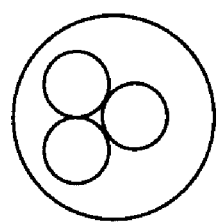
Figure 16D:
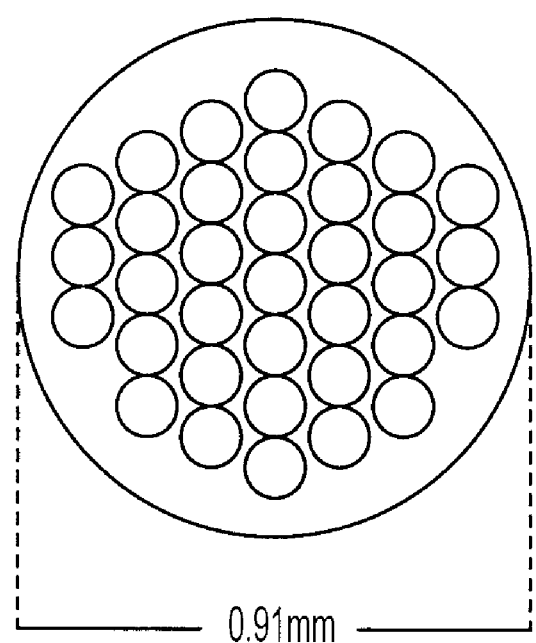
FIG. 16D is a cross sectional view of a catheter system with 36 optical fibers.

FIG. 16A-16C illustrate a catheter system 190 with multiple fiber optic pressure sensors. In this example, three pressure sensors 192, 194, and 196 are located at different locations along the catheter, corresponding to different locations in the human body. FIG. 16B is a cross-sectional view of pressure sensor 192, which includes a one-fiber probe with an optical fiber for transmitting light to and reflecting light from a silicon diaphragm supported by an integrally formed support structure, and a stainless-steel tube based housing. In this sensor, the optical fiber is a SFS100/110T with a core outer diameter of 0.1 mm, a clad outer diameter of 0.11 mm, and a coating outer diameter of 0.13 mm. The housing is formed of two stainless steel tubes, including one R-HTX-31 tube with an inner diameter of 0.127 mm and an outer diameter of 0.254 mm, and one R-HTX-28TW, with an inner diameter of 0.254 mm drilled to 0.257 mm and an outer diameter of 0.355 mm. The etched silicon diaphragm is 0.18 mm in diameter and 1 micron thick. The overall diameter of the sensor is 0.355 mm. Additional details of a suitable one-fiber pressure sensor are shown in FIG. 1A. The diaphragm and sensor can be formed as shown in FIG. 4A-4L or FIG. 5A-5E, and FIG. 6A-H. The silicon diaphragm has a support element on each face, with the outer stainless steel tubing end flush with the end of the exterior support element. FIG. 16C shows the three optical fibers for the optical fiber sensors 192, 194, and 196 bundled in the catheter sheath. Note that a catheter with a diameter of 0.91 mm can contain 36 optical fibers arranged in the bundle shown in FIG. 16D, illustrating that the catheter system 190 can support up to 36 one-fiber sensors in a bundle with a diameter of less than one millimeter.

Figure 17A:
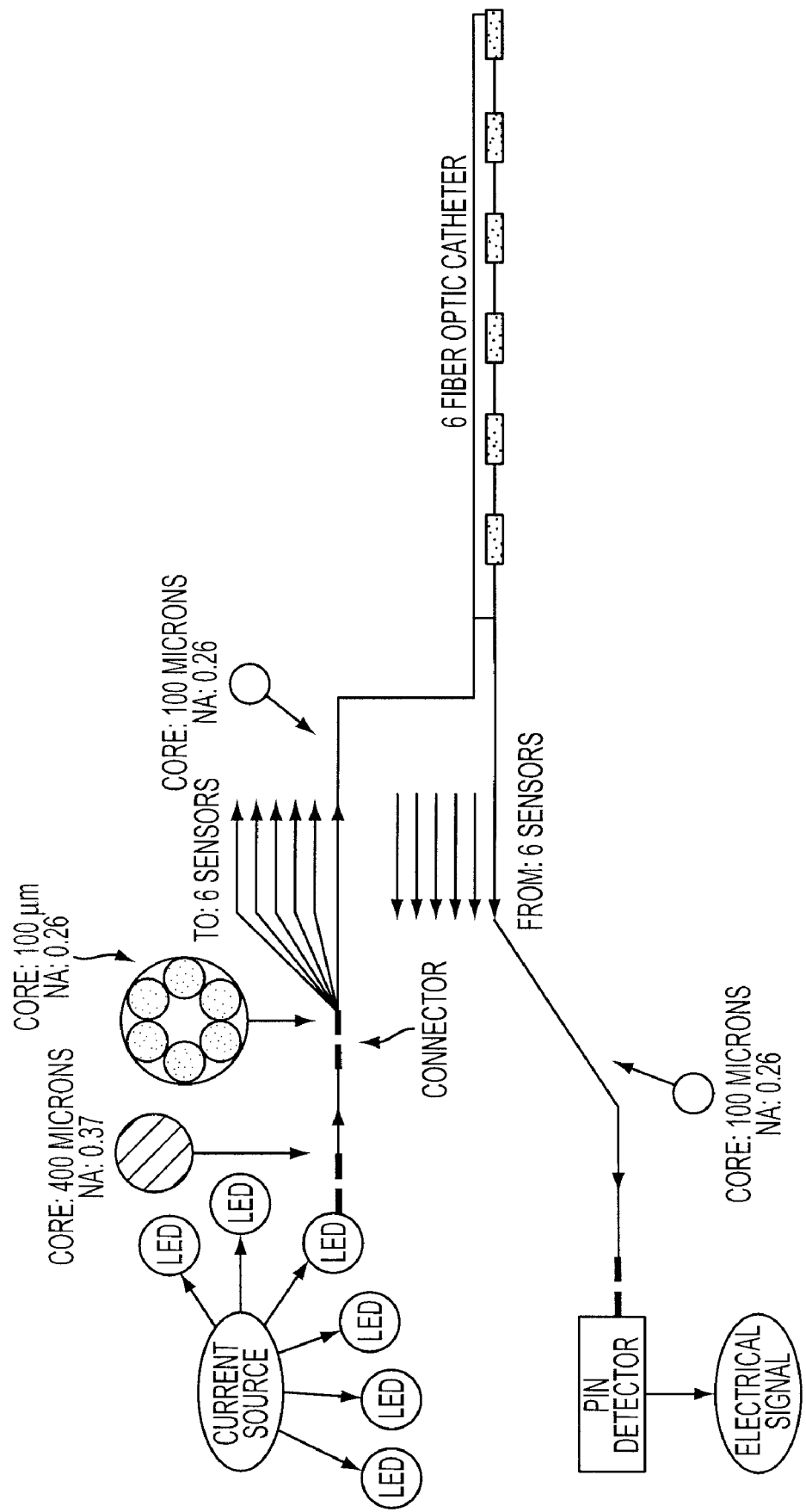
FIG. 17A-17B illustrate a catheter system with six fiber optic pressure sensors.
Figure 17B:
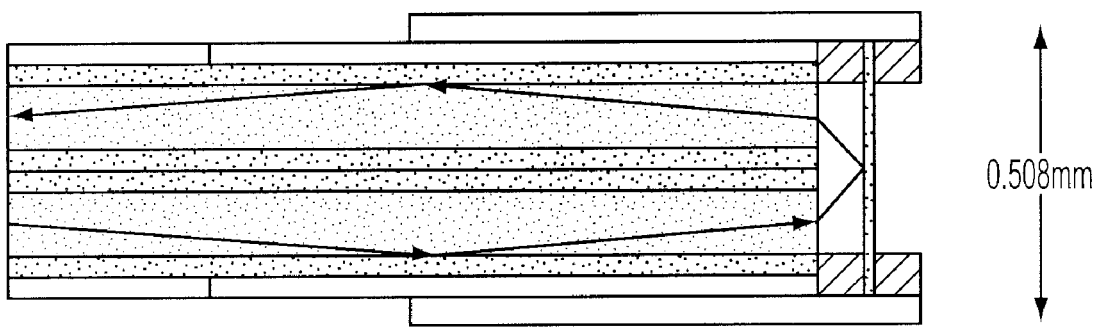
Figure 17C:
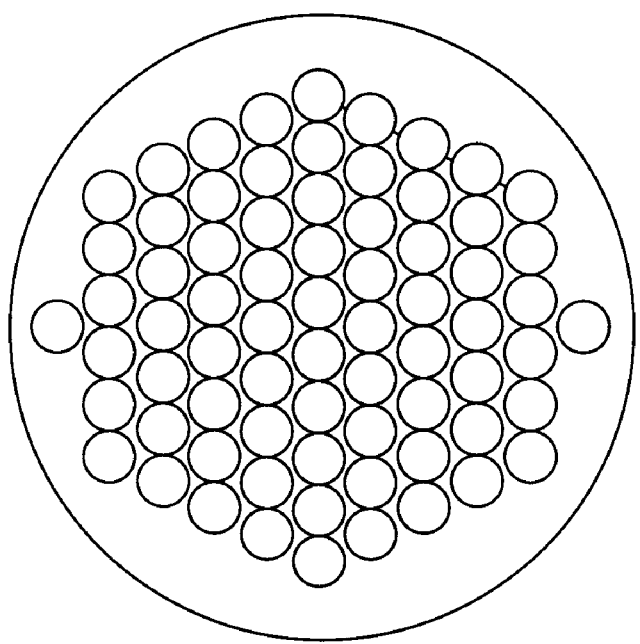
FIG. 17C is a cross sectional view of a catheter system with 72 optical fibers.

FIG. 17A-17B illustrate a system that multiplexes six optical fiber pressure sensors, each sensor having two optical fibers. The two-fiber sensor in FIG. 17B includes a two-fiber probe with an optical fiber for transmitting light to the silicon diaphragm and an optical fiber for receiving light reflected by the silicon diaphragm. In this sensor, the optical fibers are SFS100/110T with a core outer diameter of 0.1 mm, a clad outer diameter of 0.11 mm, and a coating outer diameter of 0.13 mm. The housing is formed of two stainless steel tubes, including one R-HTX-25 tube with an inner diameter of 0.254 drilled to 0.357 mm and an outer diameter of 0.508 mm, and one R-HTX-28, with an inner diameter of 0.178 mm drilled to 0.225 mm and an outer diameter of 0.355 mm. The etched silicon diaphragm is 0.20 mm in diameter and 1 micron thick. The overall diameter of the sensor is 0.508 mm. Additional details of a two-fiber pressure sensor are shown in FIGS. 3A and 3B. The diaphragm and sensor can be formed as shown in FIG. 4A-4L or FIG. 5A-5E, and FIG. 6A-H. The catheter includes twelve optical fibers, two for each of the six sensors. Note that the FIG. 17C cross section shows seventy two optical fibers in a catheter sheath slightly larger than one mm, indicating that the catheter can include thirty six two-fiber pressure sensors.

Figure 18A:
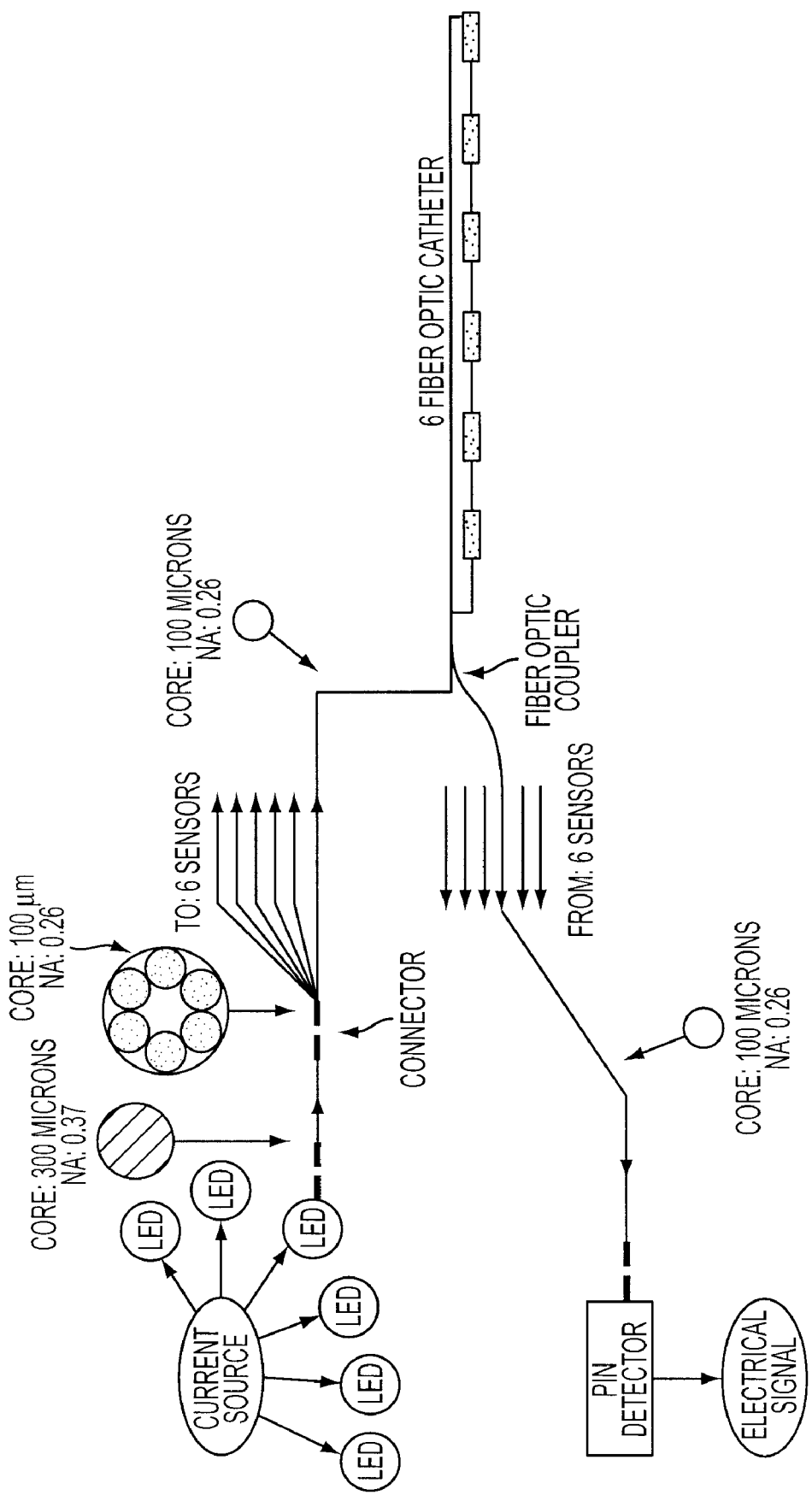
FIG. 18A-18B illustrate a catheter system with six fiber optic pressure sensors.
Figure 18B:
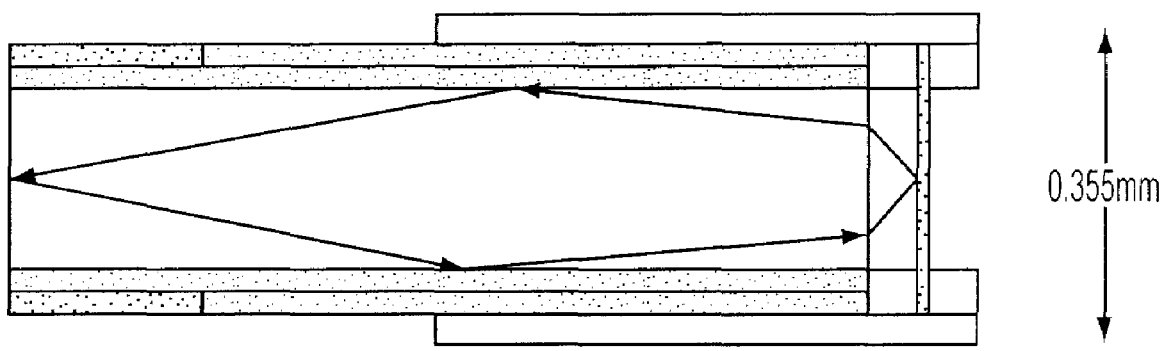
Figure 18C:
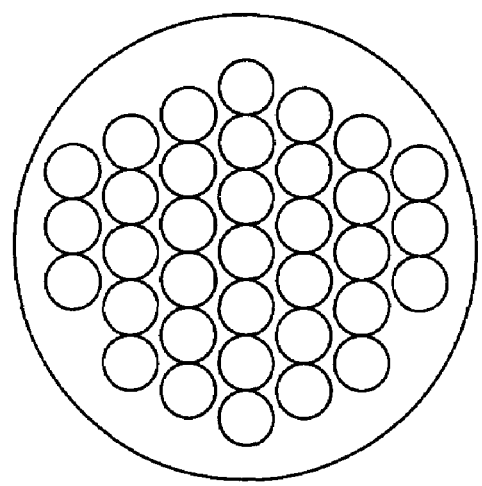
FIG. 18C is a cross sectional view of a catheter system with 36 optical fibers.

FIG. 18A-18B illustrate a system that multiplexes six optical fiber pressure sensors, each sensor having one optical fiber. The one-fiber pressure sensor in FIG. 18B includes a one-fiber probe with an optical fiber for transmitting light to and receiving light from the silicon diaphragm after reflection. In this sensor, the optical fiber is SFS100/110T with a core outer diameter of 0.1 mm, a clad outer diameter of 0.11 mm, and a coating outer diameter of 0.13 mm. The fiber coating has been stripped from the optical fiber at the location at which the fiber is inserted into the sensor's housing. The housing is formed of two stainless steel tubes, including one R-HTX-31 tube with an inner diameter of 0.127 and an outer diameter of 0.254 mm, and one R-HTX-28TW, with an inner diameter of 0.254 mm drilled to 0.257 mm and an outer diameter of 0.355 mm. The etched silicon diaphragm is 0.18 mm in diameter and 1 micron thick. The overall diameter of the sensor is 0.355 mm. Additional details of a one-fiber pressure sensor are shown in FIG. 1A. The sensor can be formed as shown in FIG. 4A-4L or FIG. 5A-5E, and FIG. 6A-H. The catheter includes six optical fibers, one for each pressure sensor. Note that the FIG. 18C cross section shows thirty six optical fibers in a catheter sheath with a diameter less than one millimeter, indicating that this catheter can include thirty six one-fiber pressure sensors.

As shown in FIGS. 17A and 18A, light is supplied to the catheters using a LED light source, and a larger diameter core (e.g., 300-400 micron) fiber that directly couples light to a number of transmitting fibers. In the FIGS. 17A and 18A embodiments, the larger core optical fiber has a core diameter of 400 microns. An arrangement for directly coupling light from a larger diameter fiber to several smaller diameter core fibers is disclosed in U.S. Pat. No. 7,379,630 to Lagakos et al., entitled "Multiplexed Fiber Optic Pressure Sensor System", the entire disclosure of which is incorporated herein in its entirety. The multiplexing allows one current source to support six LEDs, and each LED to supply light to six optical fibers, so each LED can supply light to six sensors.

The catheters of FIG. 16A-16D, FIG. 17A-17C, and FIG. 18A-18C can also be coated with a flexible biocompatible film for use in a human body.

Other aspects of the invention include voice recognition systems and surveillance systems using dynamic pressure sensors (microphones) described herein. Arrays of pressure sensors and microphones can be used for monitoring machinery to alert users of impending failures.

Suitable thicknesses, diameters, and materials for diaphragms in embodiments of the invention also include those disclosed in U.S. Pat. No. 7,149,374 to Lagakos et al., the disclosure of which is incorporated by reference herein in its entirety.

Obviously, many modifications and variations of the present invention are possible in light of the above teachings. It is therefore to be understood that the claimed invention may be practiced otherwise than as specifically described.

What is claimed as new and desired to be protected by Letters Patent of the United States is:

1. An intensity modulated fiber optic pressure sensor, comprising:
   at least one multimode optical fiber with a core and cladding surrounding the core;
   a silicon diaphragm having a reflective surface and having an outer circumferential edge attached to a cylindrical support element; and
   at least one cylindrical housing disposed circumferentially around the diaphragm and the optical fiber, an end face of the cylindrical housing being adhered to the cylindrical support element,
   the diaphragm having an exterior face exposed to the exterior environment,
   the diaphragm, the support element, and an end of the optical fiber forming a cavity,
   wherein the diaphragm and the cylindrical support element are formed by a process of masking and etching a portion of a first silicon layer of a silicon-on-insulator wafer, wherein the unetched portion forms the cylindrical support element, and a portion of a second thinner silicon layer of the silicon-on-insulator wafer that is exposed by the etching forms the diaphragm.

2. The sensor according to claim 1, wherein the reflective surface comprises a metallic layer evaporated onto the diaphragm.

3. An intensity modulated fiber optic pressure sensor, comprising:
   at least one multimode optical fiber with a core and cladding surrounding the core;
   a silicon diaphragm having a reflective surface and having an outer circumferential edge attached to a cylindrical support element; and
   at least one cylindrical housing disposed circumferentially around the diaphragm and the optical fiber, an end face of the cylindrical housing being adhered to the cylindrical support element,
   the diaphragm having an exterior face exposed to the exterior environment,
   the diaphragm, the support element, and an end of the optical fiber forming a cavity,
   wherein the diaphragm is formed by a process of:
   providing a wafer with a thin silicon layer and a silicon substrate layer separated from the thin silicon layer by a silica layer;
   masking and etching channels through the silicon substrate layer in a pattern of concentric circles to form a circular unetched portion of the silicon substrate layer between concentric circular etched channels, said etching exposing the silica in the concentric circular etched channels;

removing a photoresist material;

and dissolving an exposed portion of the silica layer to expose the thin silicon layer in the concentric circular etched channels, wherein the unetched circular portion of the silicon substrate layer forms the spacer and the thin silicon layer forms the diaphragm.

4. The sensor according to claim 1, wherein the at least one optical fiber includes only one optical fiber.

5. The sensor according to claim 1, wherein the at least one optical fiber includes two optical fibers.

6. The sensor according to claim 1, wherein the at least one optical fiber includes one optical fiber located along a central axis of the sensor and six optical fibers arranged around the one optical fiber.

7. The sensor according to claim 1, wherein in operation, light is transmitted from the end face of one of the at least one optical fibers, a pressure difference between the exterior and the cavity causes deflection of the diaphragm and causes a change in an amount of light reflected by the diaphragm into one of the at least one optical fibers.

8. The sensor according to claim 7, wherein the pressure difference is a static pressure difference.

9. The sensor according to claim 7, wherein the pressure difference is a dynamic pressure difference.

10. The sensor according to claim 1, wherein the housing includes at least one cylindrical tube.

11. The sensor according to claim 10, wherein the cylindrical tube is stainless steel.

12. The sensor according to claim 1, wherein the housing includes two concentric tubes, and an inner one of the two concentric tubes has an end face adhered to the cylindrical support element, and an outer one of the two concentric tubes has an end face that extends in a longitudinal direction at least as far as the exterior surface of the diaphragm.

13. The sensor according to claim 1, further comprising:
a second cylindrical support element disposed on an opposite face of the diaphragm, aligned with the cylindrical support element.

14. The sensor according to claim 1, further comprising:
a flexible polymer sheath enclosing the pressure sensor.

15. The sensor according to claim 1, wherein the diaphragm has a thickness of between about 1 and 2 microns.

16. A fiber optic pressure catheter system, comprising:
a plurality of fiber optic pressure sensors according to claim 1, wherein said optical fibers of each of the plurality of fiber optic pressure sensors are bundled in a catheter sleeve with a diameter of less than 1 mm.

17. A method of forming an optical fiber sensor, comprising:

providing a wafer with a silicon substrate layer and a thin silicon layer having a thickness less than the thickness of the silicon substrate layer, and a silica layer positioned between the silicon substrate layer and the thin silicon layer;

masking and etching a pattern of concentric channels through the silicon substrate layer to form a continuous unetched portion of the silicon substrate layer between the concentric channels, said etching exposing the silica layer in the concentric etched channels;

exposing the thin silicon layer in the etched portion;

forming a reflective coating on the exposed portion of the thin silicon layer;

positioning a first hollow tube with an end face of the tube abutting the flat surface of the continuous unetched portion of the silicon substrate layer and affixing the end face of the first hollow tube to the unetched portion of the silica layer;

positioning an optical fiber probe having at least one optical fiber within the tube with an end face of the optical fiber spaced apart from the second silicon layer; and affixing the optical fiber probe within the first hollow tube.

18. The method according to claim 17, wherein said positioning the optical fiber probe within the housing includes monitoring an amount of light reflected by the diaphragm and received by a photodetector while moving the optical fiber probe, and affixing the optical fiber probe within the tube at a distance at which the amount of light received by a photodetector is above a predetermined level.

19. The method according to claim 17, wherein the first hollow tube is cylindrical, wherein the concentric etched channels are circular, wherein the continuous unetched portion of the silicon substrate layer is circular, and the end face of the first hollow tube is adhered to the circular continuous unetched portion of the silicon substrate layer.

20. The method according to claim 19, wherein the housing further includes a second cylindrical tube surrounding the first cylindrical tube, the method further comprises:

breaking the wafer away from the first metal tube;

positioning the second cylindrical tube with an end extending beyond the diaphragm; and adhering the second cylindrical tube to the first cylindrical tube.

21. The sensor according to claim 3, wherein the at least one optical fiber includes only one optical fiber or only two optical fibers.

22. The sensor according to claim 3, wherein the at least one optical fiber includes one optical fiber located along a central axis of the sensor and six optical fibers arranged around the one optical fiber.

23. The sensor according to claim 3, wherein in operation, light is transmitted from the end face of one of the at least one optical fibers, a pressure difference between the exterior and the cavity causes deflection of the diaphragm and causes a change in an amount of light reflected by the diaphragm into one of the at least one optical fibers.

24. The sensor according to claim 3, wherein the housing includes at least one cylindrical tube.

25. The sensor according to claim 24, wherein the cylindrical tube is stainless steel.

26. The sensor according to claim 3, wherein the housing includes two concentric tubes, and an inner one of the two concentric tubes has an end face adhered to the cylindrical support element, and an outer one of the two concentric tubes has an end face that extends in a longitudinal direction at least as far as the exterior surface of the diaphragm.

27. The sensor according to claim 3, further comprising:
a second cylindrical support element disposed on an opposite face of the diaphragm, aligned with the cylindrical support element.

28. The sensor according to claim 3, further comprising:
a flexible polymer sheath enclosing the pressure sensor.

29. The sensor according to claim 3, wherein the diaphragm has a thickness of between about 1 and 2 microns.

30. A fiber optic pressure catheter system, comprising:
a plurality of fiber optic pressure sensors according to claim 3, wherein said optical fibers of each of the plurality of fiber optic pressure sensors are bundled in a catheter sleeve with a diameter of less than 1 mm.

* * * * *